(12) United States Patent
Teraguchi et al.

(10) Patent No.: US 11,667,218 B2
(45) Date of Patent: Jun. 6, 2023

(54) VEHICLE SEAT RECLINING DEVICE

(71) Applicant: TOYOTA BOSHOKU KABUSHIKI KAISHA, Aichi (JP)

(72) Inventors: Hiroaki Teraguchi, Aichi-ken (JP); Takeshi Nishiura, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 135 days.

(21) Appl. No.: 17/439,246

(22) PCT Filed: Mar. 18, 2020

(86) PCT No.: PCT/JP2020/012059
§ 371 (c)(1),
(2) Date: Sep. 14, 2021

(87) PCT Pub. No.: WO2020/189726
PCT Pub. Date: Sep. 24, 2020

(65) Prior Publication Data
US 2022/0144150 A1    May 12, 2022

(30) Foreign Application Priority Data

Mar. 18, 2019 (JP) .............................. JP2019-049802

(51) Int. Cl.
*B60N 2/235* (2006.01)

(52) U.S. Cl.
CPC .................................. *B60N 2/2356* (2013.01)

(58) Field of Classification Search
CPC ................................................... B60N 2/2356
See application file for complete search history.

(56) References Cited

U.S. PATENT DOCUMENTS

| 9,242,583 | B2 | 1/2016 | Endou et al. |
| 2015/0035337 | A1* | 2/2015 | Yamada .............. B60N 2/2356 |
| | | | 297/367 P |
| 2015/0035339 | A1 | 5/2015 | Endou et al. |
| 2018/0009340 | A1 | 1/2018 | Nagura et al. |

(Continued)

FOREIGN PATENT DOCUMENTS

| JP | 2015-29635 A | 2/2015 |
| JP | 2015-227071 A | 12/2015 |
| JP | 2016-147526 A | 8/2016 |

(Continued)

OTHER PUBLICATIONS

International Search Report issued in International Patent Application No. PCT/JP2020/012059, dated Jun. 9, 2020 (and translation thereof).

(Continued)

*Primary Examiner* — Anthony D Barfield
(74) *Attorney, Agent, or Firm* — Greenblum & Bernstein, P.L.C.

(57) ABSTRACT

A seat reclining device includes a ratchet, a guide, and pawls for locking relative rotation between the ratchet and the guide. The ratchet has a second convex portion protruding so as to abut against a ride-up protrusion of a main pawl. The second convex portion has, only in a partial region thereof in the rotation direction, a relief concave portion configured to avoid abutment in the rotation direction between the ride-up protrusion and the second convex portion.

6 Claims, 34 Drawing Sheets

(56) References Cited

U.S. PATENT DOCUMENTS

2018/0043800 A1* 2/2018 Maeda ................ B60N 2/2356
2020/0156512 A1   5/2020 Teraguchi et al.

FOREIGN PATENT DOCUMENTS

| JP | 2016-159687 A | 9/2016 |
| WO | WO2016-129423 A1 | 8/2016 |
| WO | WO2018-216787 A1 | 11/2018 |

OTHER PUBLICATIONS

Written Opinion issued in International Application No. PCT/JP2020/012059, dated Jun. 9, 2020.

* cited by examiner

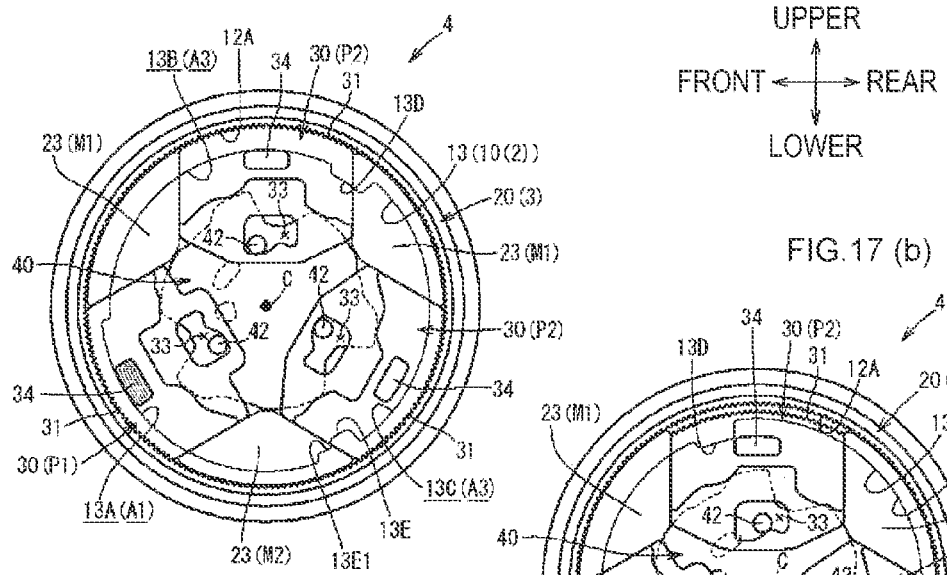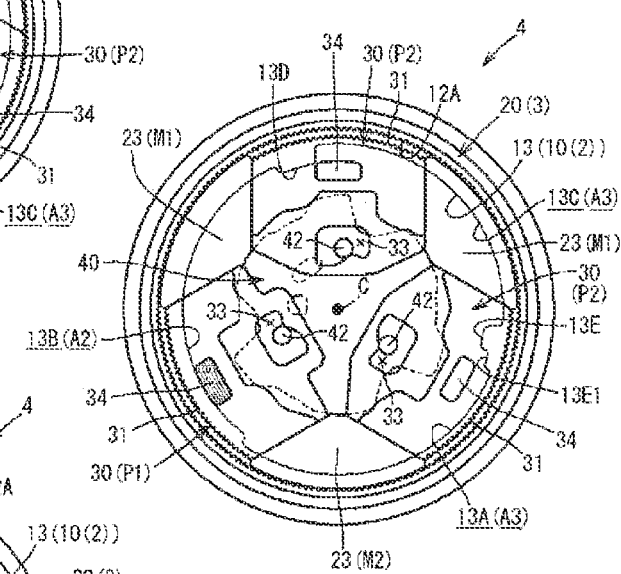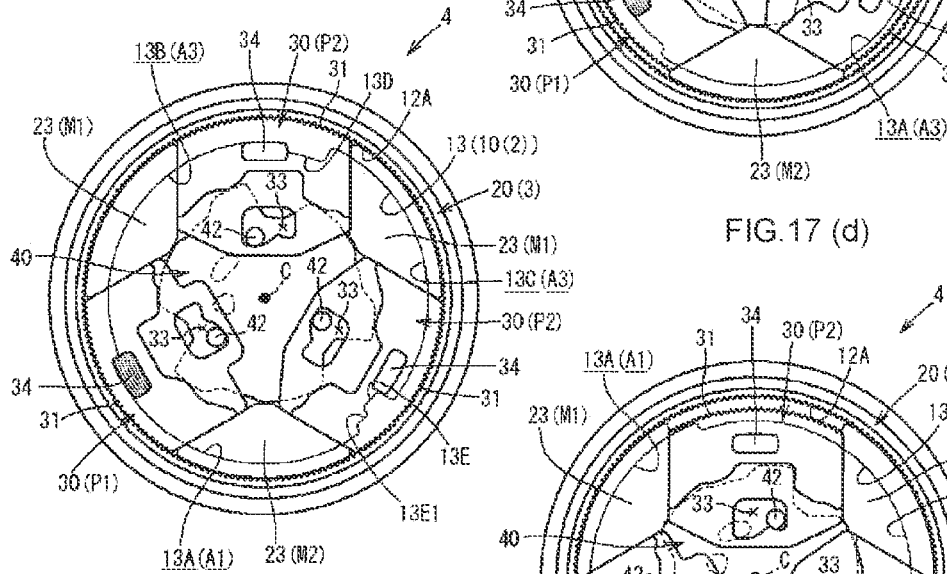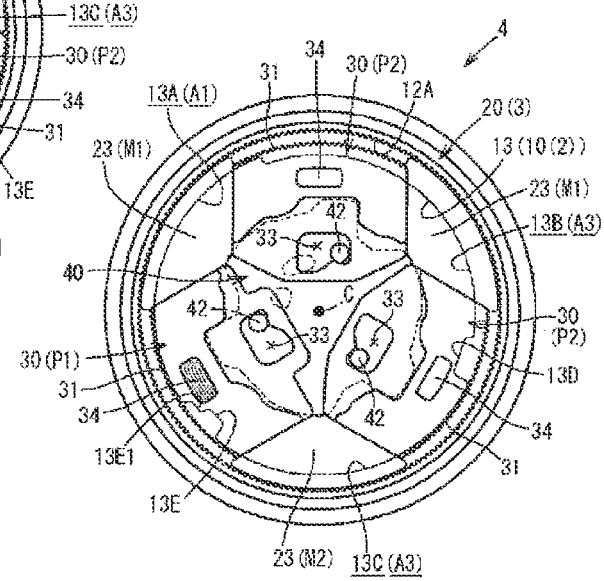

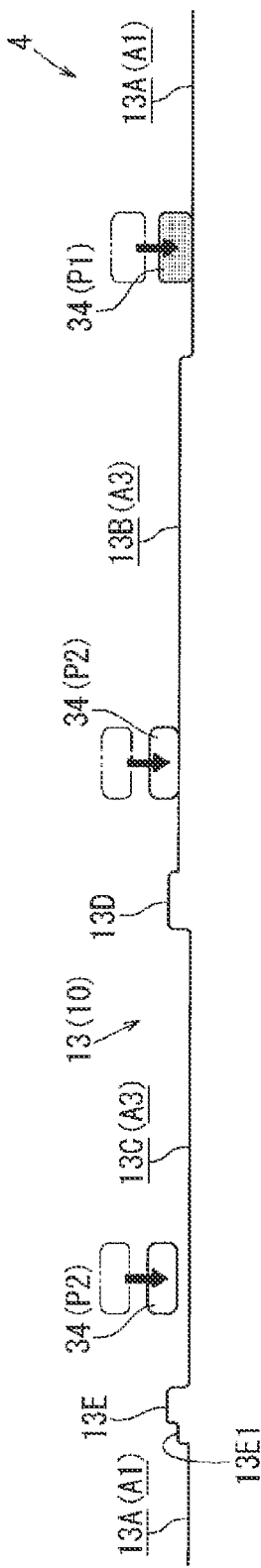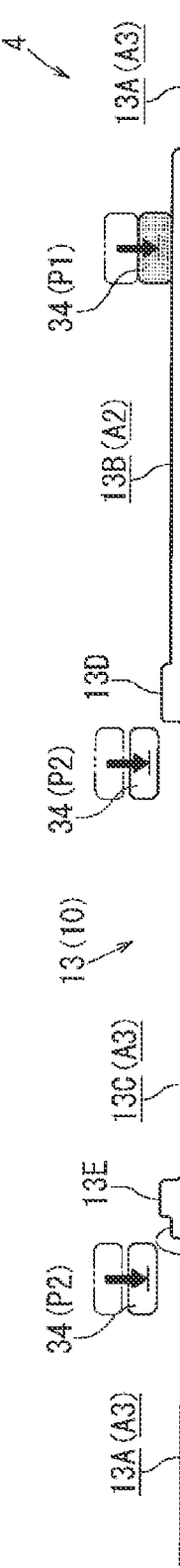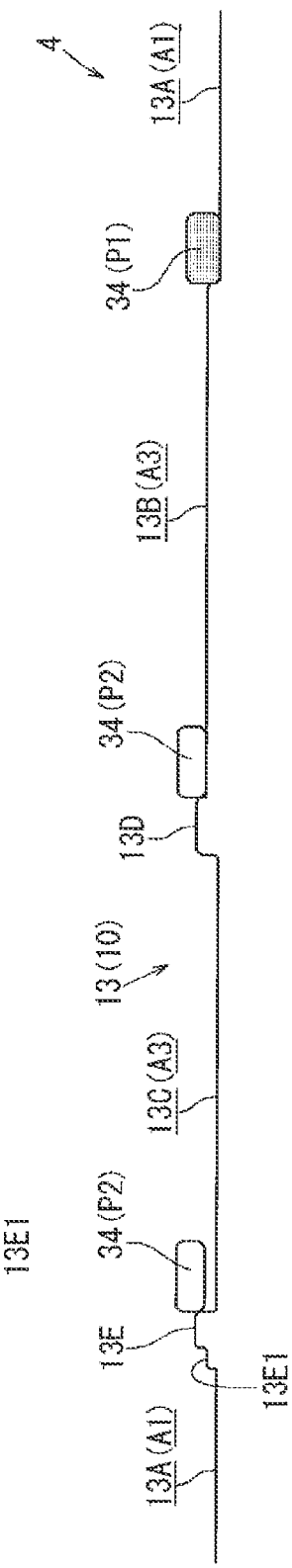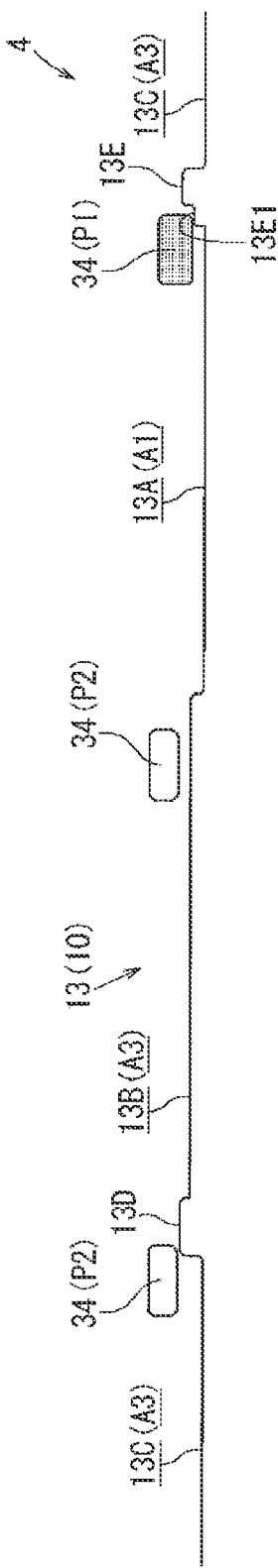
FIG.18 (a) FIG.18 (b) FIG.18 (c) FIG.18 (d)

VEHICLE SEAT RECLINING DEVICE

TECHNICAL FIELD

The present invention relates to a vehicle seat reclining device. More specifically, the present invention relates to a vehicle seat reclining device for adjusting an inclination angle of a seat back.

BACKGROUND ART

In related art, as a vehicle seat reclining device, a seat reclining device having a stepped lock mechanism capable of adjusting a backrest angle of a seat back at a constant pitch angle is known (see Patent Literature 1). The vehicle seat reclining device is a joint device that couples the seat back to a seat cushion in such a way that the backrest angle is adjustable. Specifically, the vehicle seat reclining device includes a ratchet and a guide that are constituted by substantial disc-shaped metal members assembled to be rotatable relative to each other, and a lock mechanism that locks the relative rotation between the ratchet and the guide.

The lock mechanism is configured such that a plurality of pawls set on the guide are urged and thereby pressed against inner circumferential teeth formed on an outer circumferential portion of the ratchet, thereby locking the relative rotation between the ratchet and the guide. More specifically, a rotation region with respect to the guide of the ratchet is provided with a lock region that allows meshing of each pawl and a free region that causes each pawl to ride on a ride-up surface so as to prevent the meshing of the pawl.

Due to the free region, the seat back is tilted to a forward-tilting position serving as the free region upon operation on a release lever, and thus is held in an unlocked state even when the operation on the release lever is recovered. That is, by the seat back entering the free region, meshing of each pawl to the ratchet due to the recovery of the release lever is prevented by the pawl riding on the ride-up surface. Specifically, a ride-up protrusion formed on the pawl rides on the ride-up surface, so that the meshing of pawl to the ratchet is blocked halfway.

CITATION LIST

Patent Literature

Patent Literature 1: WO 2016/129423 A1

SUMMARY OF INVENTION

Technical Problem

According to the related art described above, when the seat back is tilted greatly rearward, one of the ride-up protrusions formed on the pawls abuts in the rotation direction against the ride-up surface corresponding to the ride-up protrusion of an adjacent pawl and thus a large load is applied thereto. An object of the present invention is to provide a vehicle seat reclining device capable of preventing a load for locking tilting of a seat back to a predetermined position to be applied thereto.

Solution to Problem

[1] In a first aspect of the present invention, a vehicle seat reclining device includes:

a ratchet and a guide assembled in an axial direction to be rotatable relative to each other; and a plurality of pawls arranged in a rotation direction, the plurality of pawls being configured to mesh with the ratchet to lock the relative rotation between the ratchet and the guide by moving outward in a radial direction while being supported in the rotation direction by the guide, in which the ratchet includes a lock region and a free region in a rotation region with respect to the guide, the lock region being configured to allow meshing of a particular pawl among the plurality of pawls from an inner side in the radial direction, the free region being configured to allow a ride-up protrusion of the particular pawl to ride on a ride-up surface of the ratchet so as to hinder the meshing of the particular pawl from the inner side in the radial direction, and the lock region and the free region being continuous to each other, the ratchet also includes a convex portion protruding so as to abut in the rotation direction against the ride-up protrusion of the particular pawl, the convex portion being provided at an end portion of the lock region on an opposite side of a side of the lock region that is next to the free region, and at least one of the ride-up protrusion and the convex portion has, only in a partial region thereof in the rotation direction, a relief concave portion configured to avoid abutment in the rotation direction between the ride-up protrusion and the convex portion upon rotation of the ratchet.

According to the first aspect, in a case where tilting of a seat back is to be locked to an end position of the lock region by a locking structure set outside of the vehicle seat reclining device, it is possible to prevent abutment in the rotation direction between the ride-up protrusion and the convex portion by the relief concave portion. Thereby, it is possible to prevent a load for locking the tilting of the seat back to the predetermined position from being applied to the vehicle seat reclining device.

[2] According to a second aspect of the present invention, the first aspect may be further configured in the following manner.

The convex portion serves as an abutting portion on which another pawl among the plurality of pawls abuts in the rotation direction when the ride-up protrusion of the particular pawl abuts against a step of the ride-up surface from the lock region.

According to the second aspect, it is possible to appropriately release abutment in the rotation direction between the ride-up protrusion and the convex portion without deteriorating a function of the convex portion as an abutting portion.

[3] According to a second aspect of the present invention, the first or second aspect may be further configured in the following manner.

When the ride-up protrusion overlaps with the convex portion in the radial direction in a manner that the ride-up protrusion does not abut against the convex portion in the rotation direction, meshing of the particular pawl to the ratchet is hindered by riding of the ride-up protrusion on the convex portion.

According to the third aspect, it is possible to appropriately prevent the particular pawl from meshing with the ratchet beyond the lock region.

[4] According to a fourth aspect of the present invention, any one of the first to third aspects may be further configured in the following manner.

The relief concave portion is formed in the convex portion.

According to the fourth aspect, it is possible to release abutment in the rotation direction between the ride-up protrusion and the convex portion without inhibiting a riding performance of the ride-up protrusion of the particular pawl.

[5] According to a fifth aspect of the present invention, any one of the first to fourth aspects may be further configured in the following manner.

In a case where the vehicle seat reclining device is configured to function as a joint device that couples a seat back to a base on a vehicle body in such a way that an inclination angle of the seat back is adjustable, and a locking structure configured to lock tilting of the seat back at a predetermined position is provided between the seat back and the base, the relief concave portion is configured to avoid abutment in the rotation direction between the ride-up protrusion and the convex portion upon rotation of the ratchet toward the predetermined position when the locking structure locks the tilting of the seat back to the predetermined position.

According to the fifth aspect, when the locking structure set outside of the vehicle seat reclining device locks tilting of the seat back to the predetermined position, it is possible to appropriately prevent abutment in the rotation direction between the ride-up protrusion and the convex portion.

[6] According to a sixth aspect of the present invention, the fifth aspect may be further configured in the following manner.

In the predetermined position, a gap in the rotation direction is provided between the ride-up protrusion and the convex portion.

According to the sixth aspect, when the locking structure set outside of the vehicle seat reclining device locks tilting of the seat back to the predetermined position, it is possible to more appropriately prevent abutment in the rotation direction between the ride-up protrusion and the convex portion.

(a) to (d) of FIG. 17 are cross-sectional views showing different cases of a change in the locking operation of each pawl caused by a change in a rotational position of the ratchet.

(a) to (d) of FIG. 18 are schematic views showing a positional relation between a ride-up protrusion of each pawl and a projecting portion of the ratchet in (a) to (d) of FIG. 17.

Figure 19:
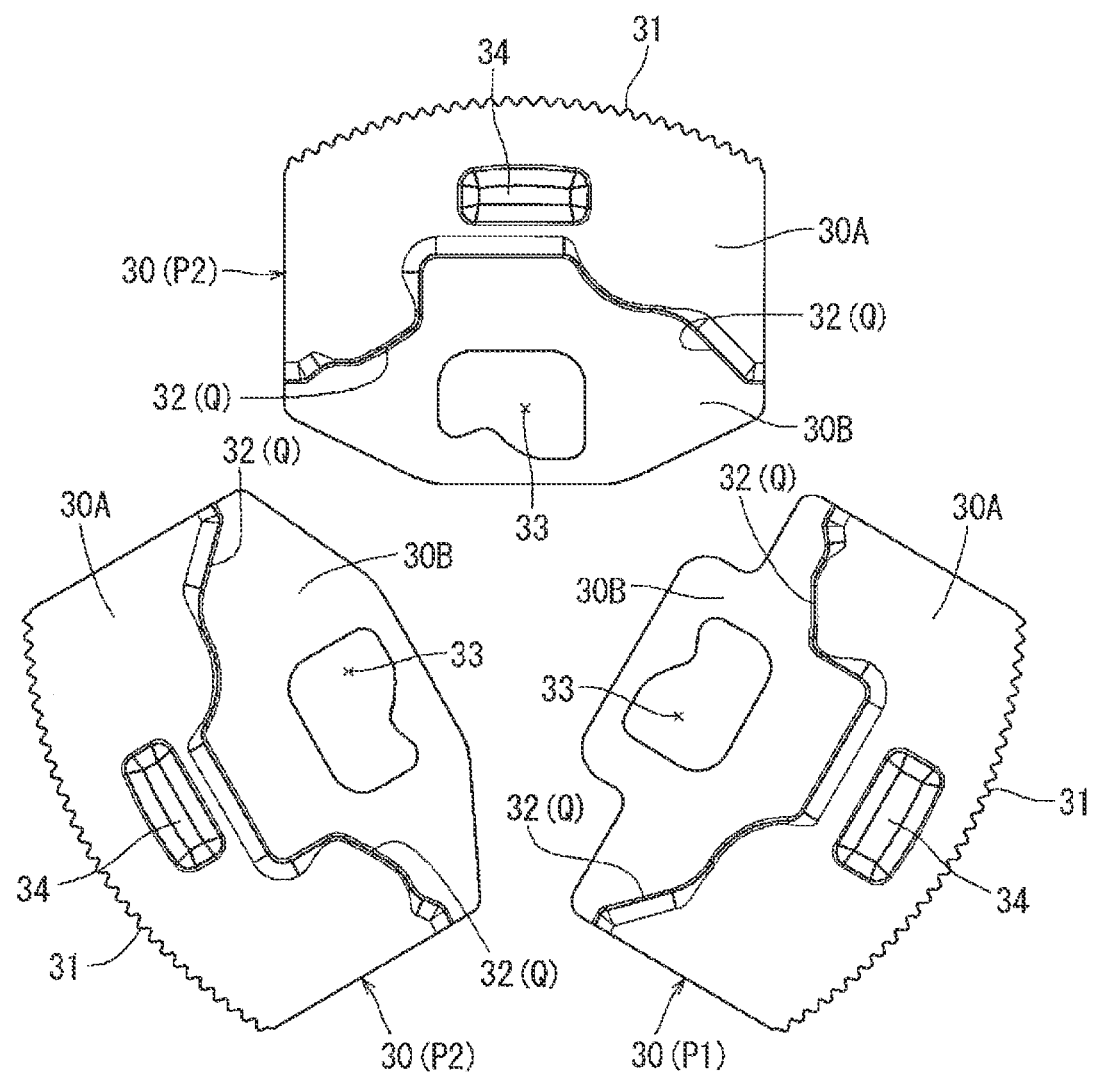

FIG. 19 is an outer side view of the pawls.

Figure 20:
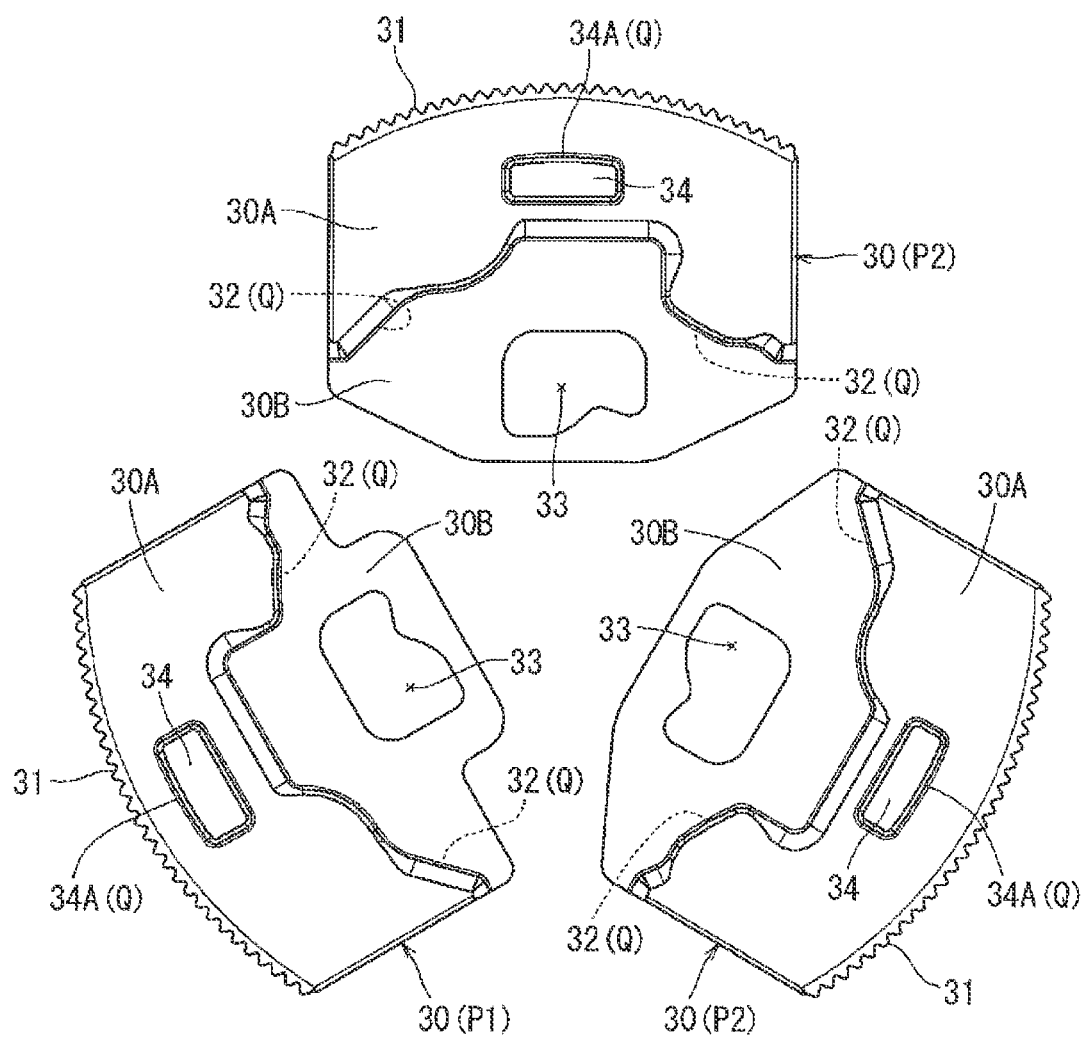

FIG. 20 is an inner side view of the pawls.

Figure 21:
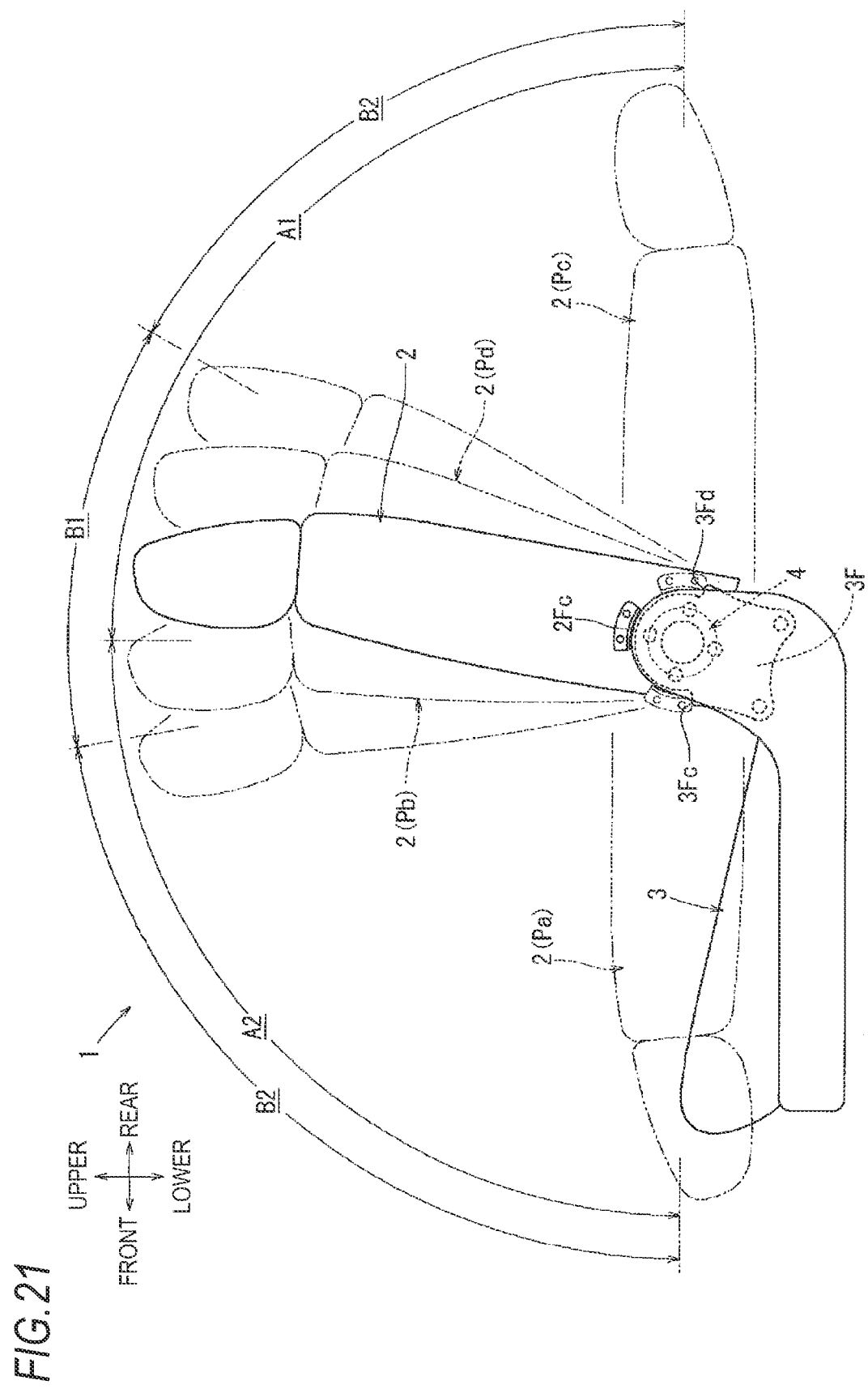

FIG. 21 is a side view showing an angle adjustment range of a seat back.

Figure 22:
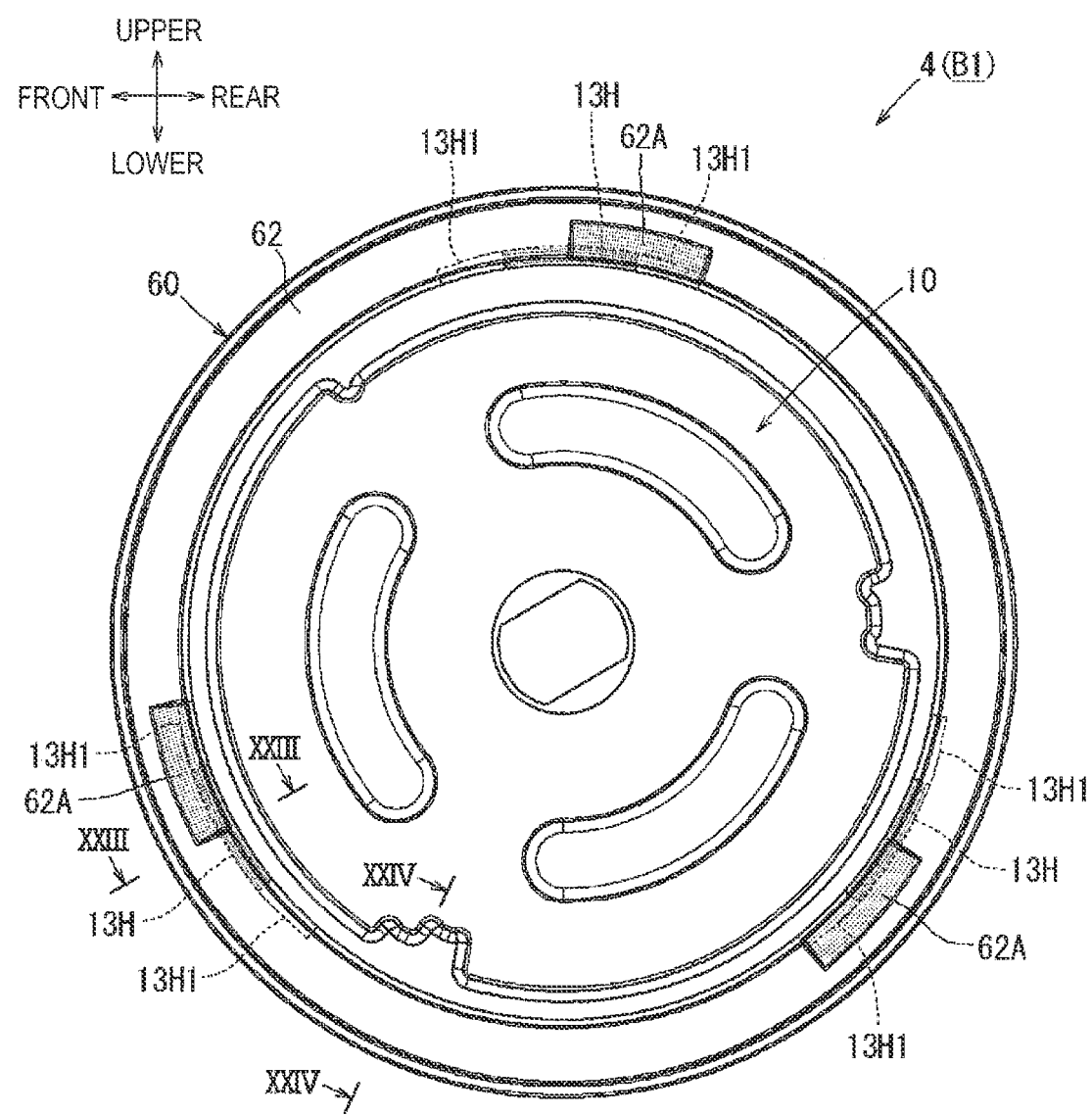

FIG. 22 is an inner side view presenting a state of the vehicle seat reclining device in FIG. 21.

Figure 23:
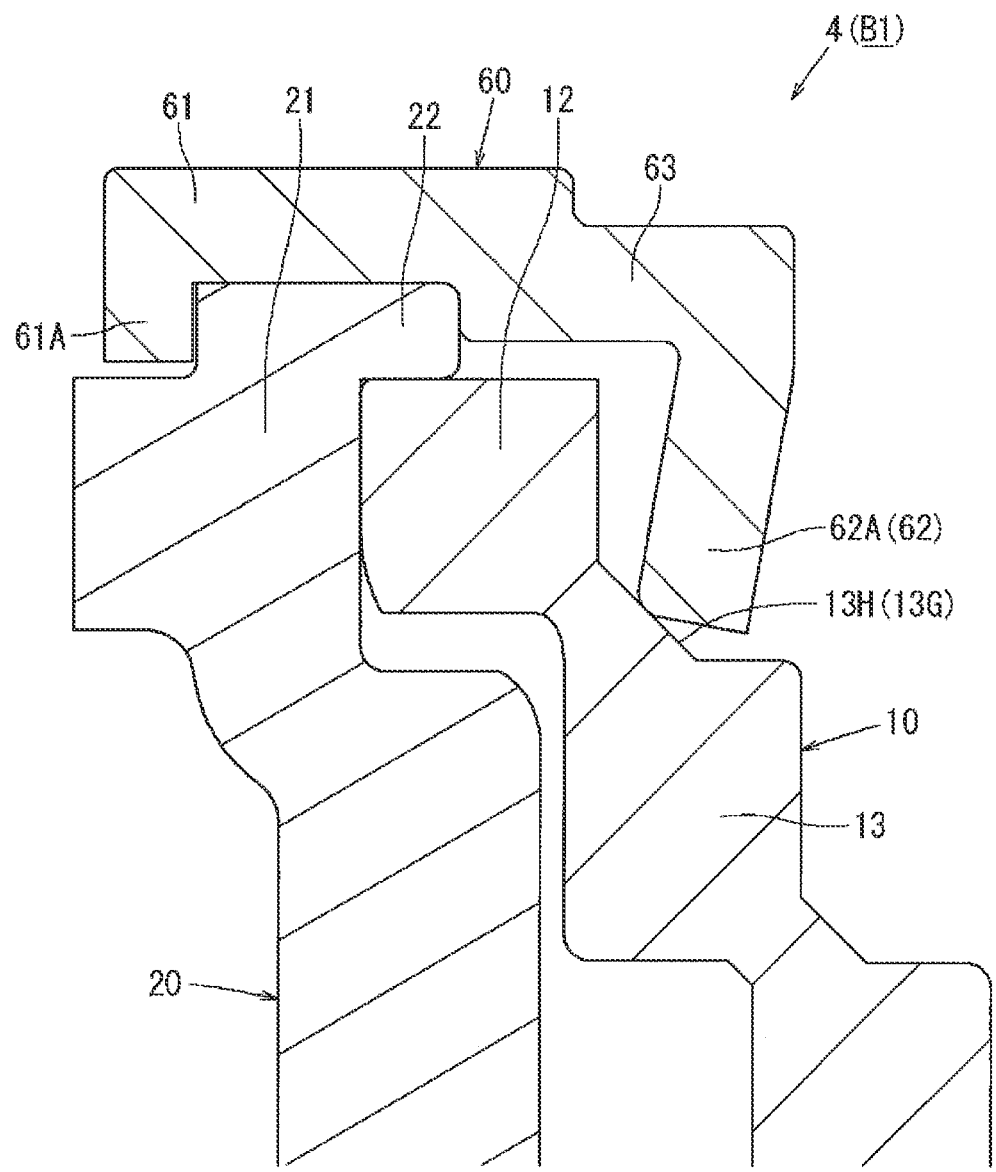

FIG. 23 is a cross-sectional view taken along line XXIII-XXIII of FIG. 22.

Figure 24:
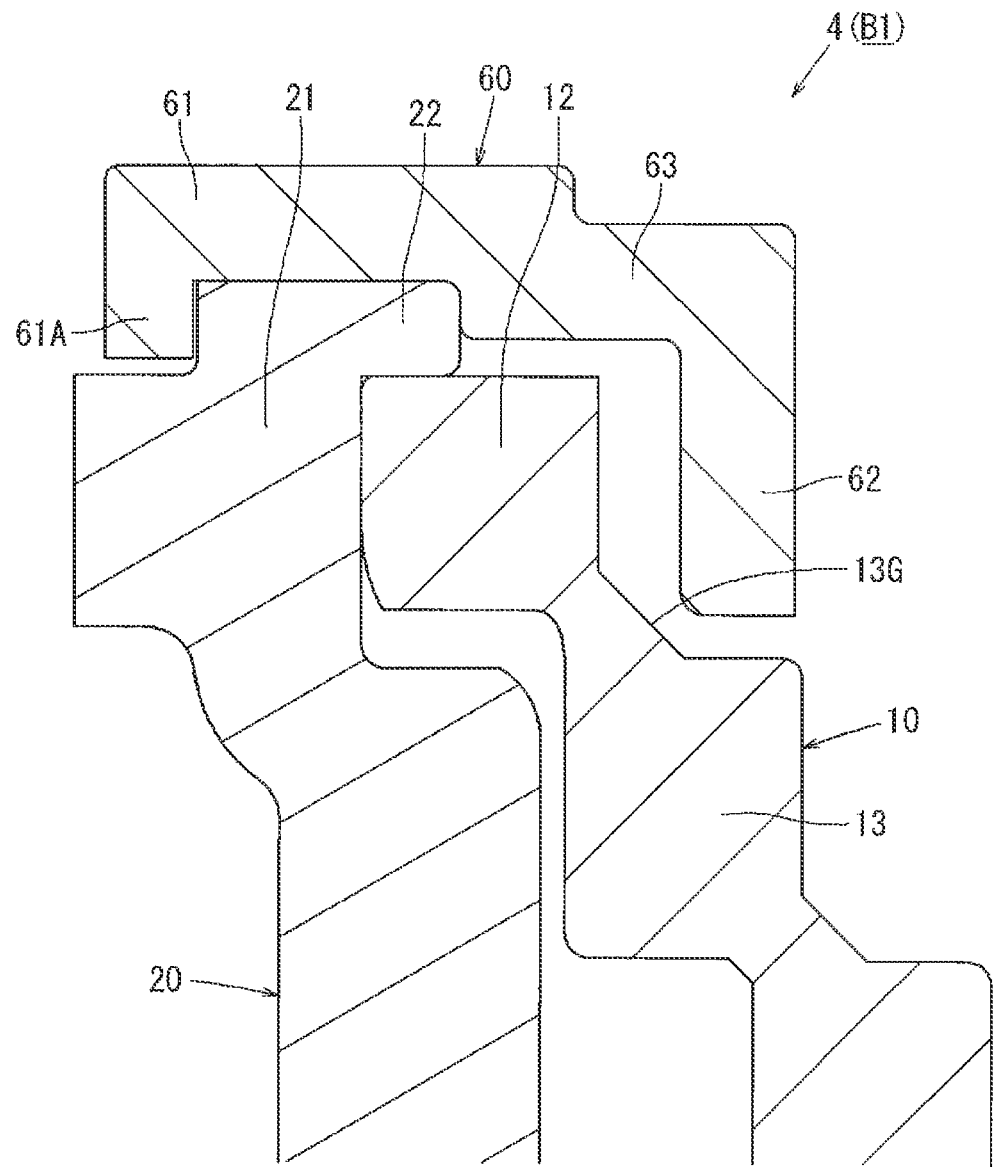

FIG. 24 is a cross-sectional view taken along line XXIV-XXIV of FIG. 22.

Figure 25:
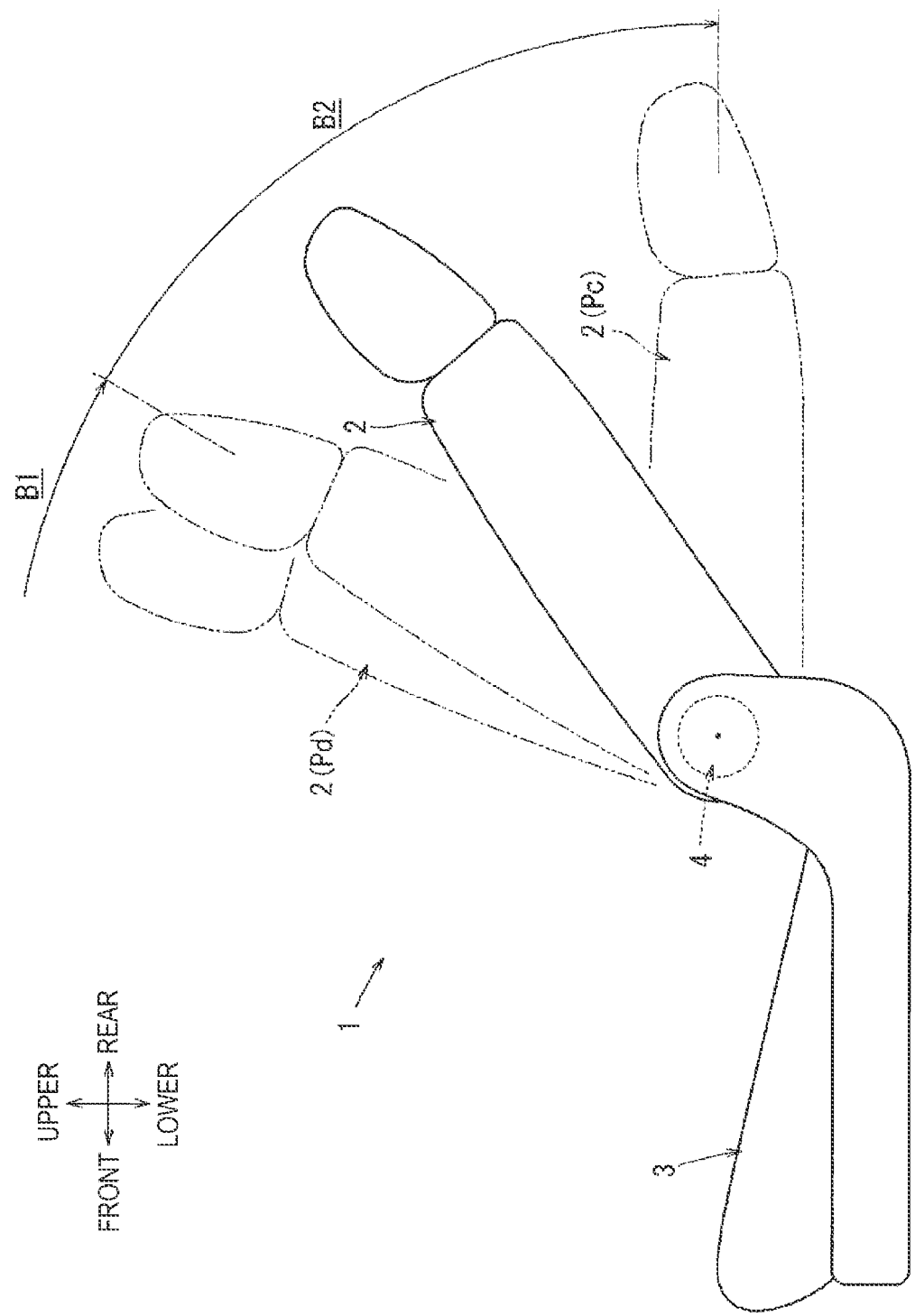

FIG. 25 is a side view showing a state in which the seat back is tilted rearward from a torso angle.

Figure 26:
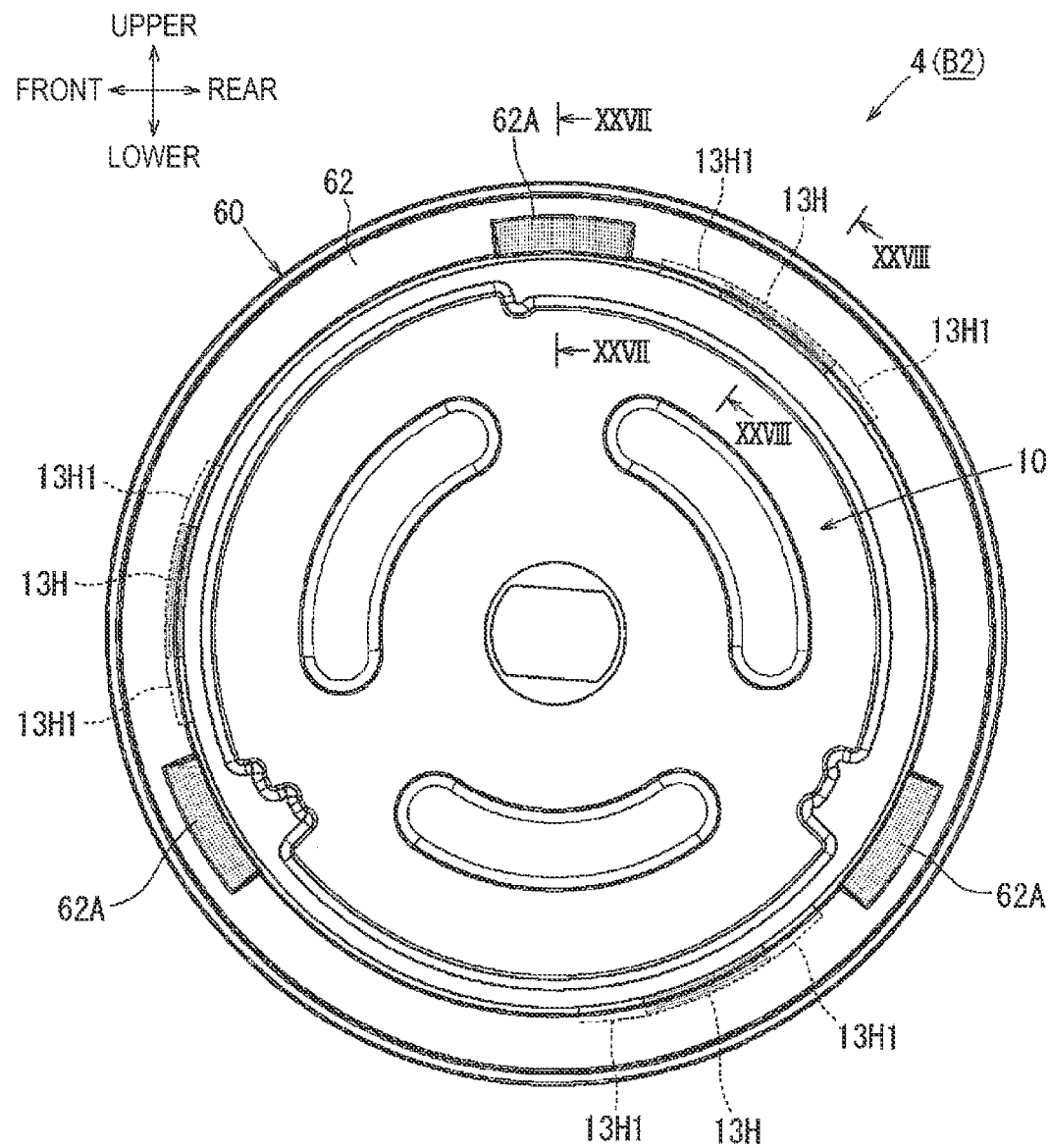

FIG. 26 is an inner side view presenting a state of the vehicle seat reclining device in FIG. 25.

Figure 27:
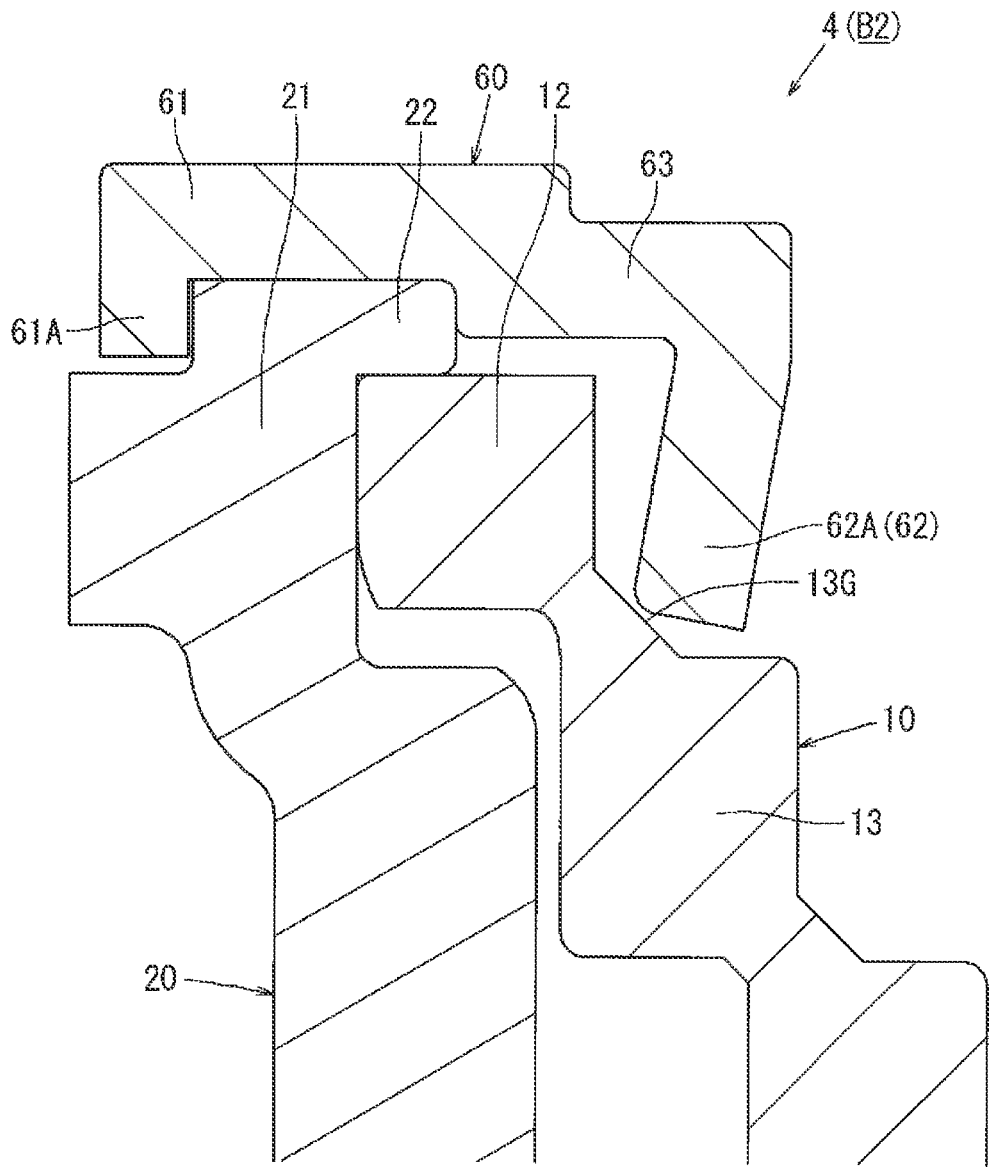

FIG. 27 is a cross-sectional view taken along line XXVII-XXVII of FIG. 26.

Figure 28:
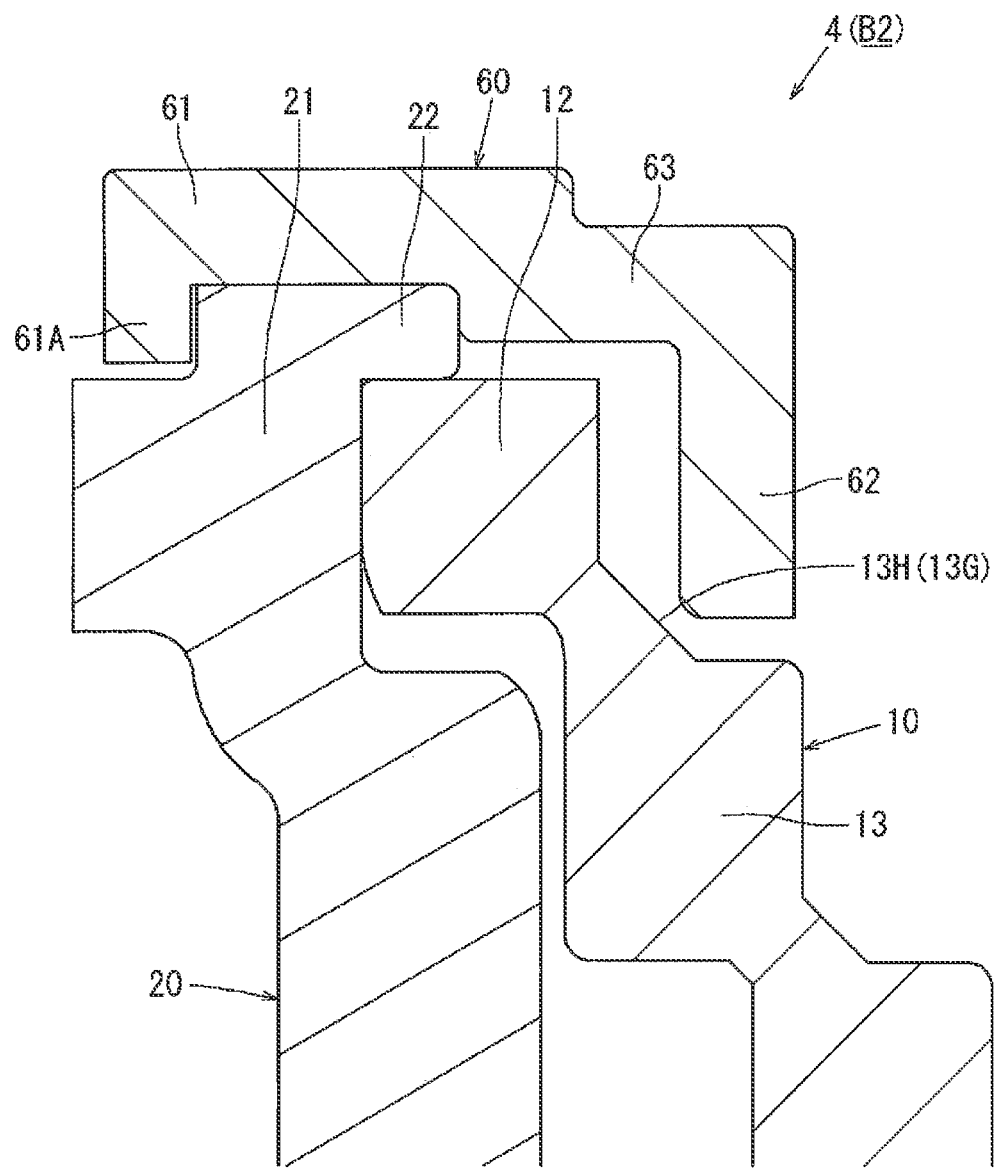

FIG. 28 is a cross-sectional view taken along line XXVIII-XXVIII of FIG. 26.

Figure 29:
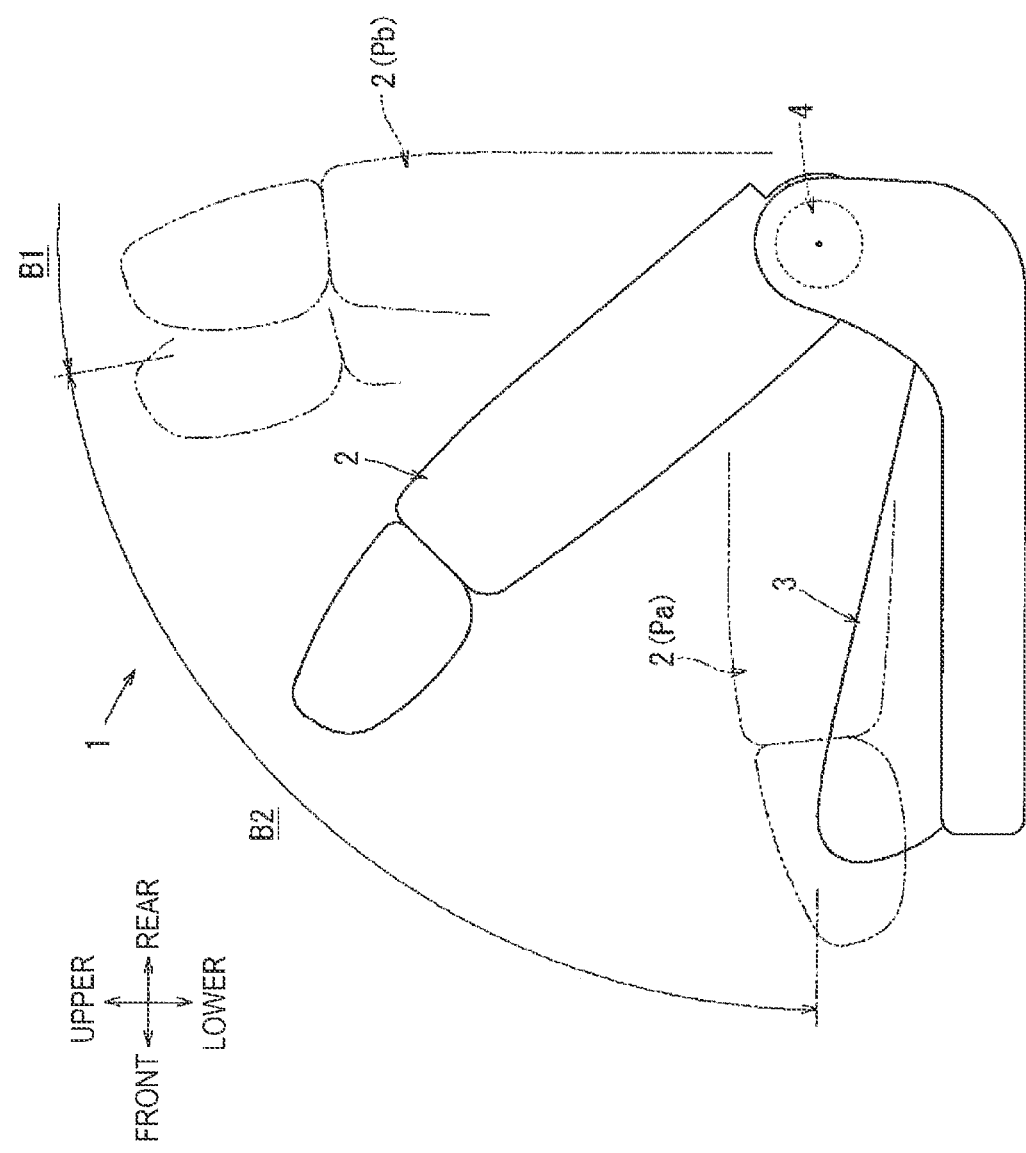

FIG. 29 is a side view showing a state in which the seat back is tilted forward from a torso angle.

Figure 30:
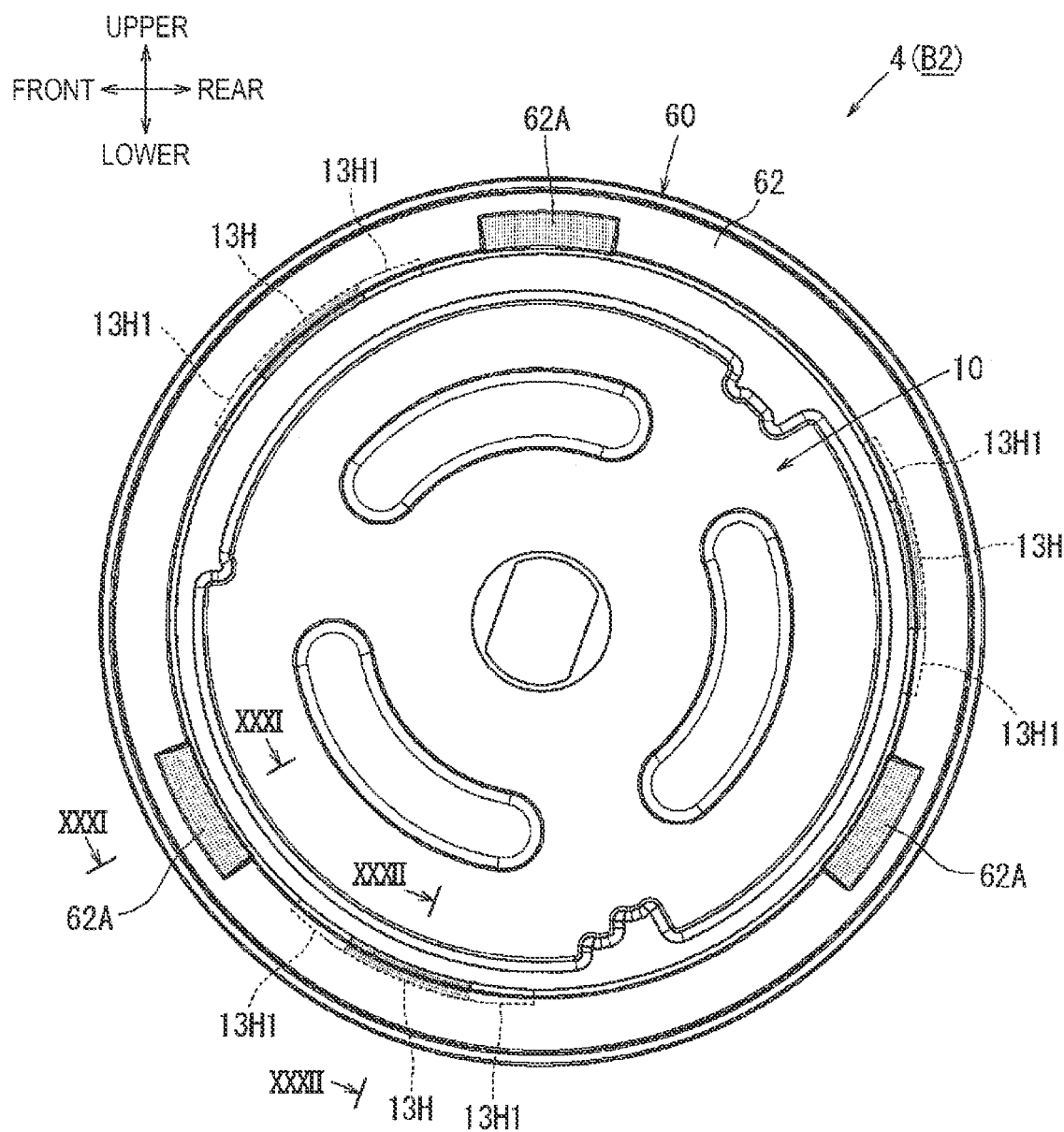

FIG. 30 is an inner side view presenting a state of the vehicle seat reclining device in FIG. 29.

Figure 31:
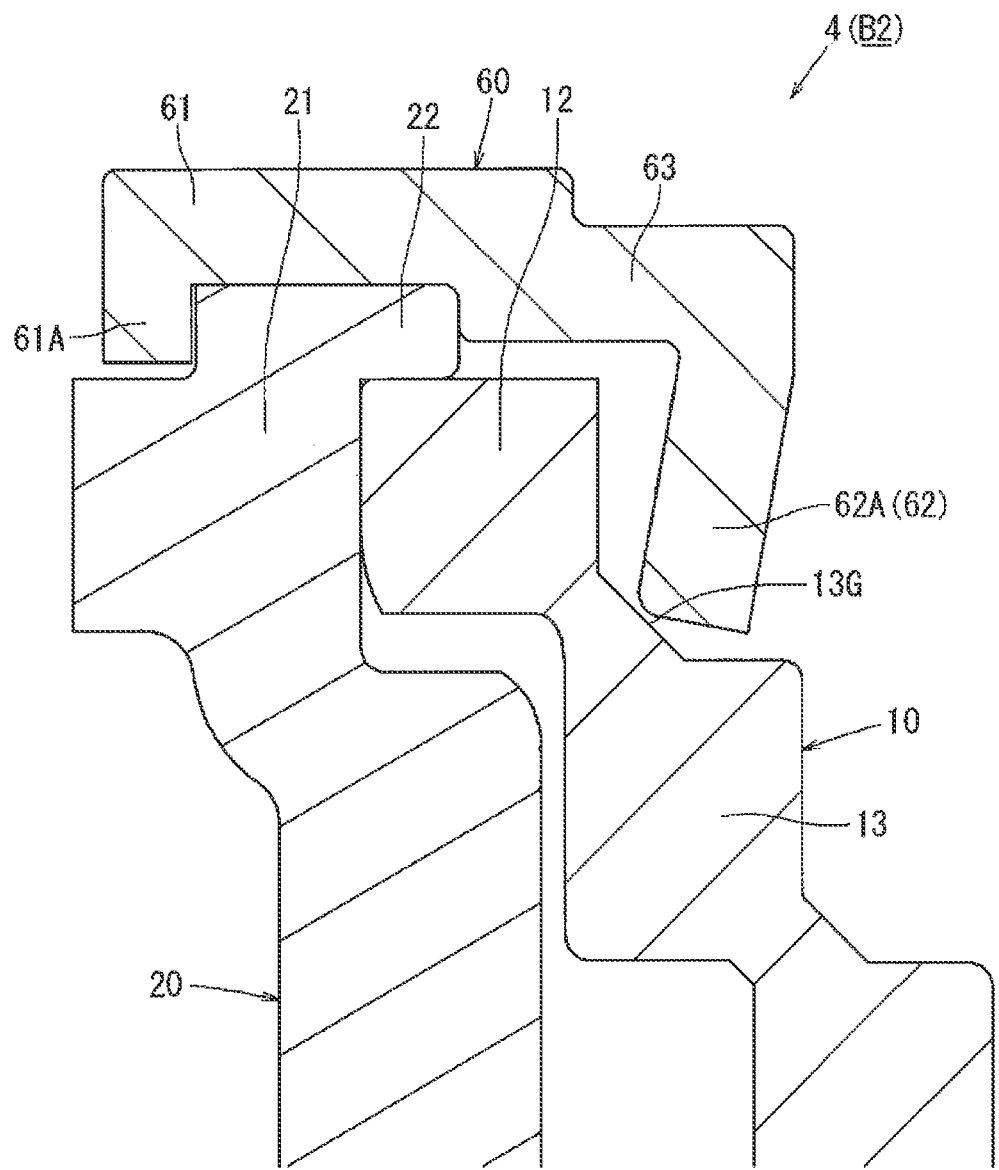

FIG. 31 is a cross-sectional view taken along line XXXI-XXXI of FIG. 30.

Figure 32:
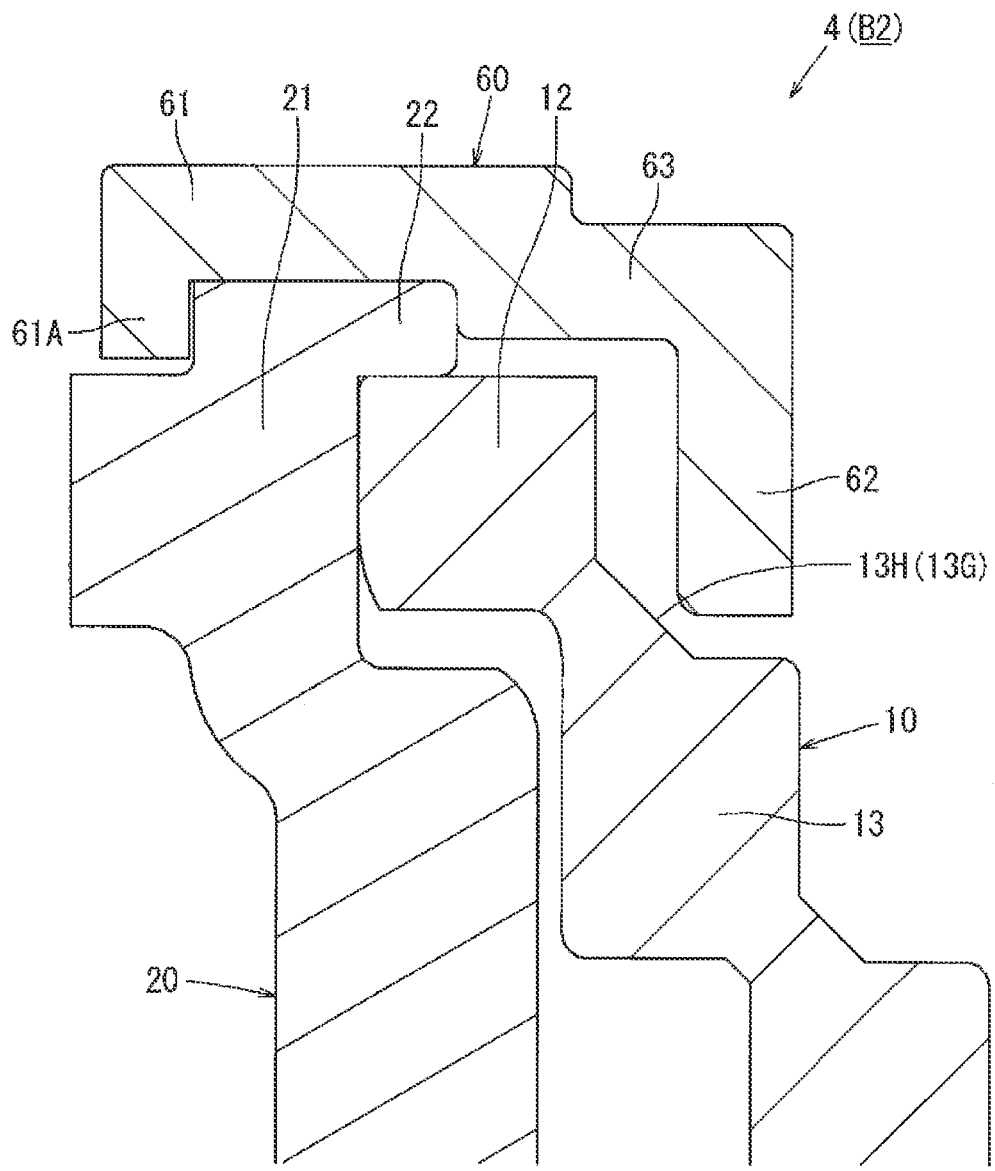

FIG. 32 is a cross-sectional view taken along line XXXII-XXXII of FIG. 30.

Figure 14:
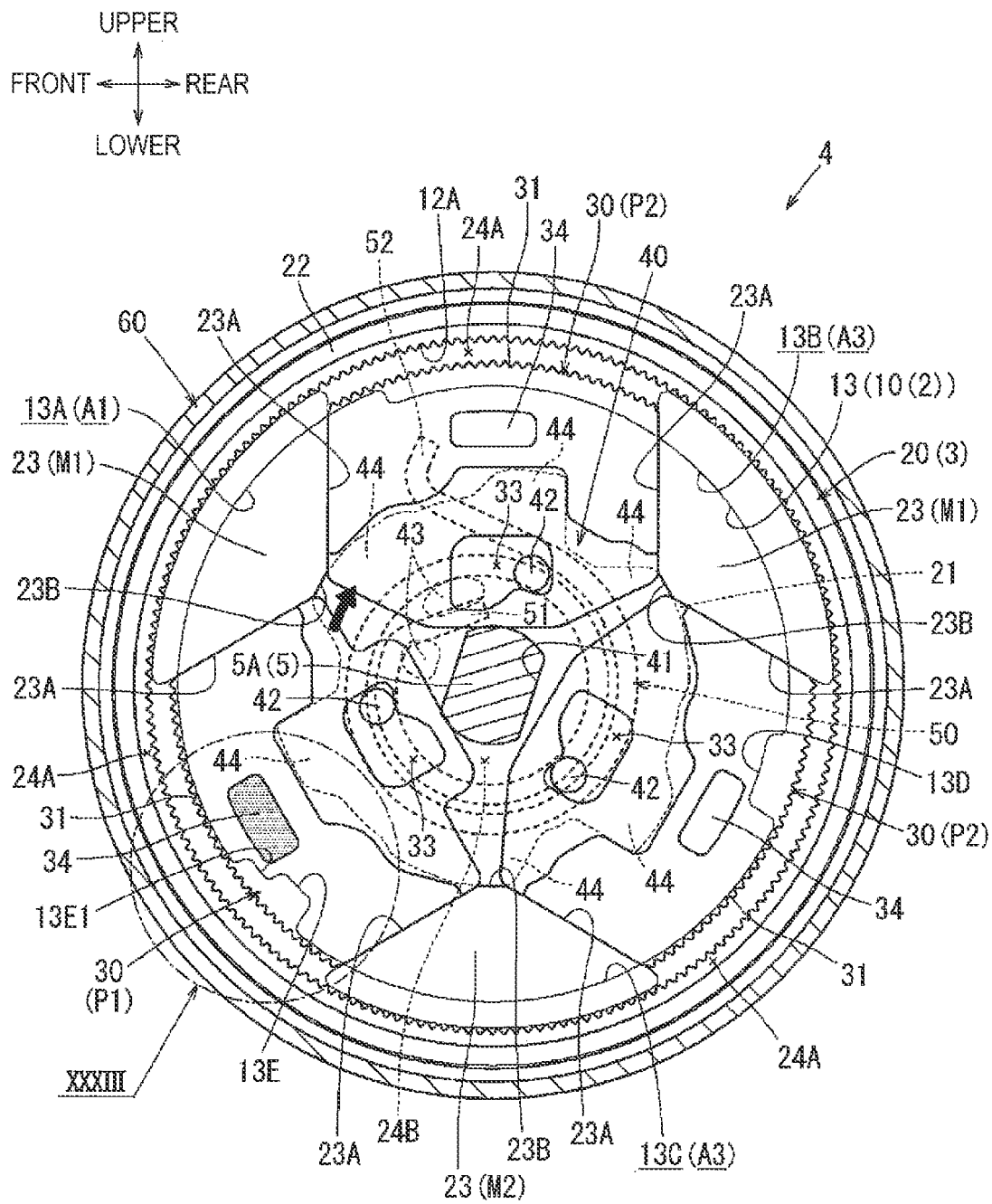
FIG. 14 is a cross-sectional view showing a state in which the ratchet is rotated to a starting position of a lock region.
Figure 33:
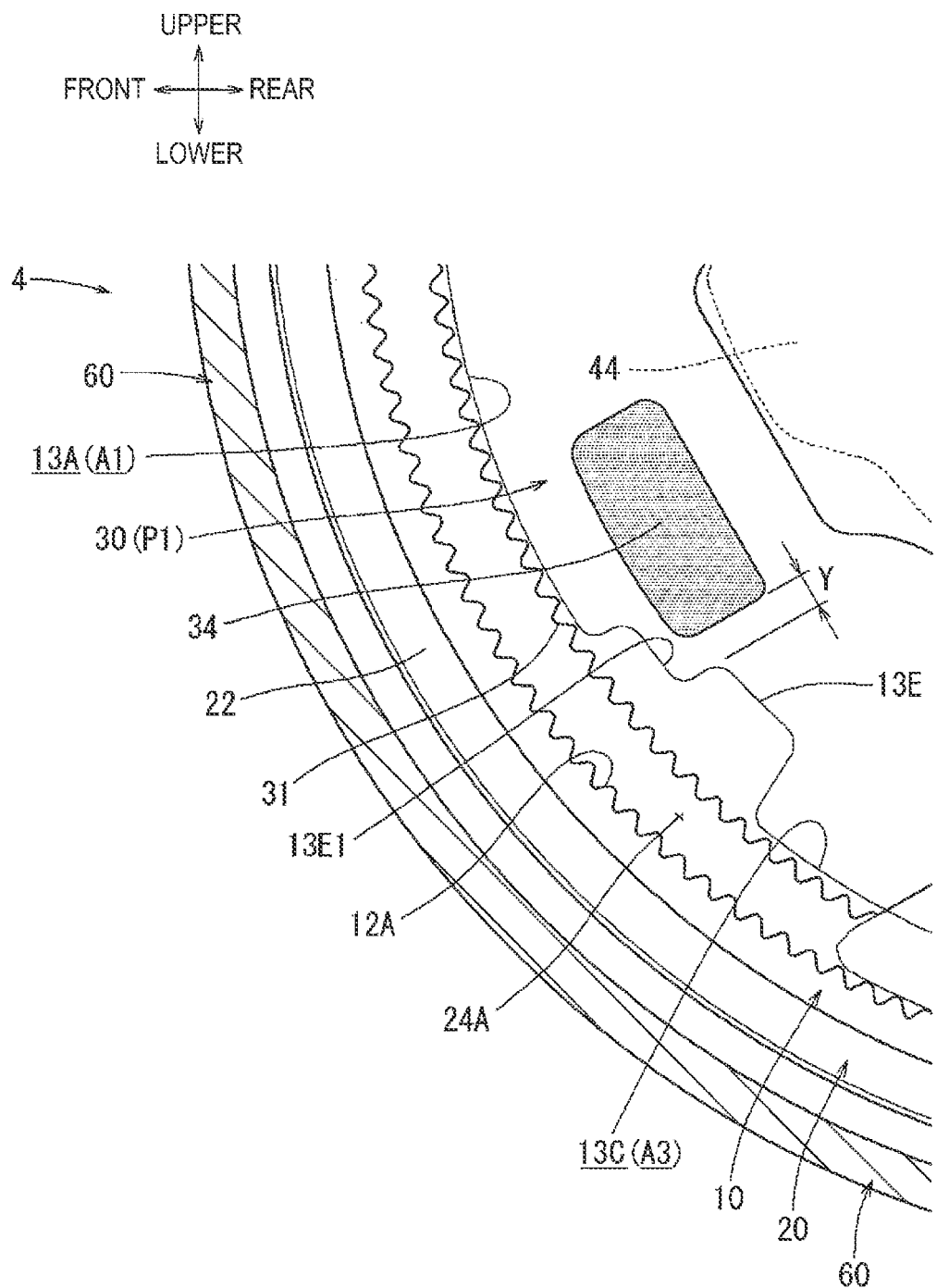

FIG. 33 is an enlarged view of a portion XXXIII in FIG. 14.

Figure 34:
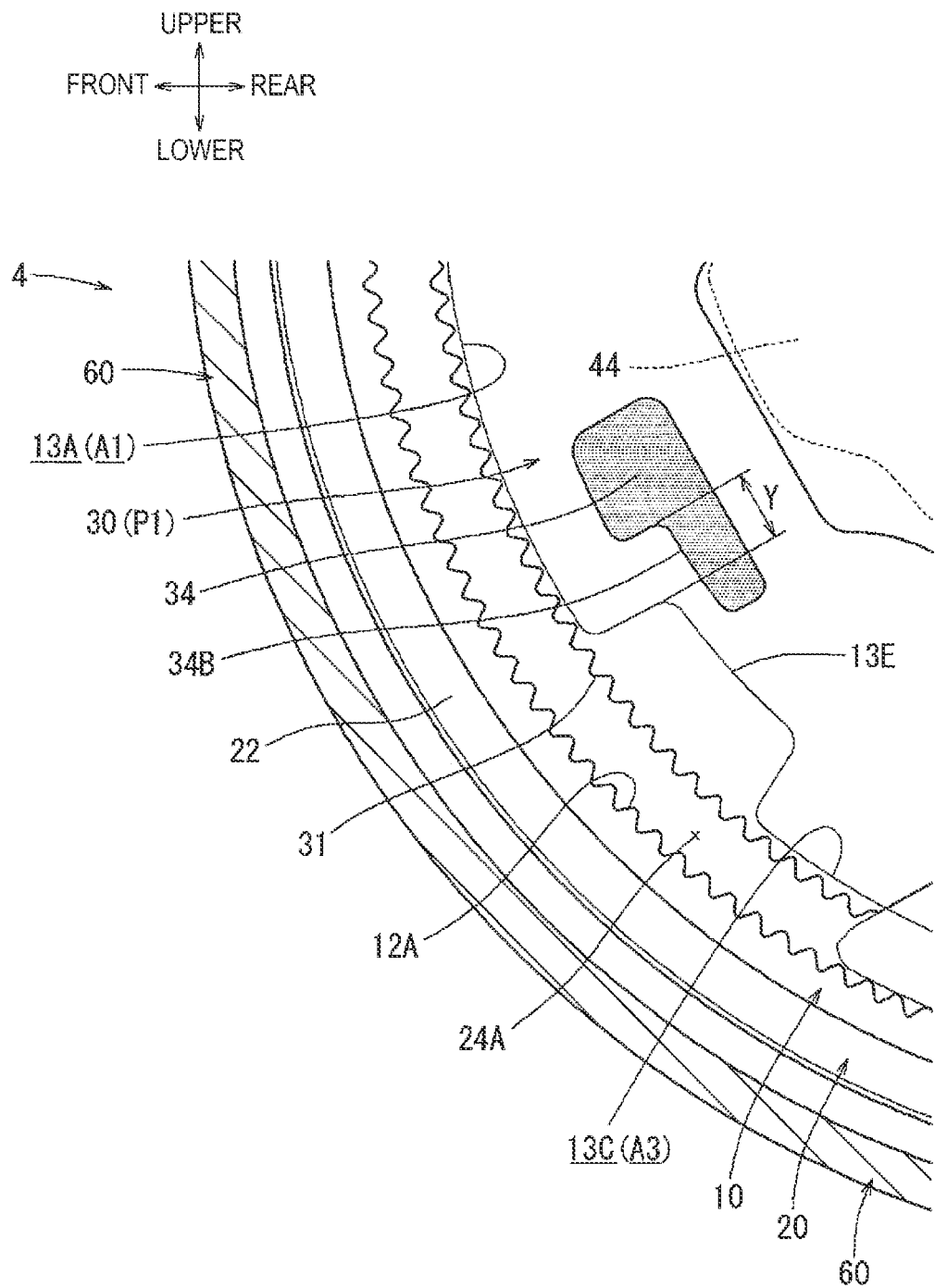

FIG. 34 is a cross-sectional view corresponding to FIG. 33 showing a configuration of a vehicle seat reclining device according to a second embodiment.

DESCRIPTION OF EMBODIMENTS

Embodiments of the present invention will be described below with reference to the drawings.

First Embodiment

<<Schematic Configuration of Seat Reclining Device 4>>

First, a configuration of a seat reclining device (vehicle seat reclining device) 4 of a first embodiment will be described with reference to FIGS. 1 to 33. In the following description, directions, such as front, rear, upper, lower, left, and right, indicate the respective directions shown in the drawings. Further, a "seat width direction" indicates a left-right direction of a seat 1 to be described later.

Figure 1:
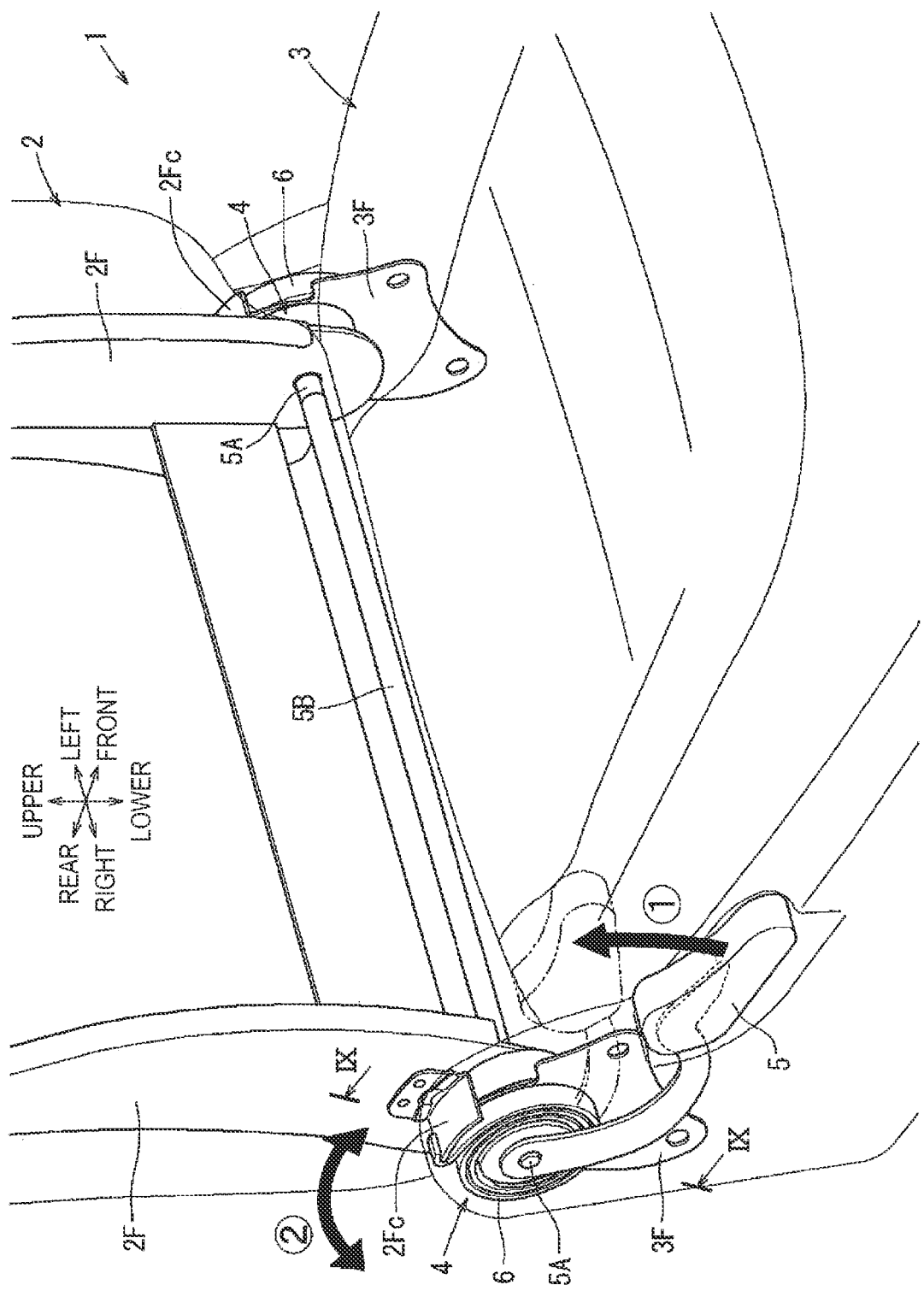
FIG. 1 is a perspective view showing a schematic configuration of a vehicle seat applied with a vehicle seat reclining device according to a first embodiment.

As shown in FIG. 1, the seat reclining device 4 of the present embodiment is applied to the seat 1 constituting a right seat of an automobile. The seat reclining device 4 is configured as a reclining adjustment mechanism that couples a seat back 2 serving as the backrest portion of the seat 1 to a seat cushion 3 serving as a seating portion in a state in which a backrest angle can be adjusted. Specifically, the seat reclining device 4 is provided in a pair of left and right between the seat back 2 and the seat cushion 3, and are switched together between locked and unlocked states, so as to fix or release the backrest angle of the seat back 2. Here, the seat cushion 3 corresponds to the "base" of the present invention.

Figure 2:
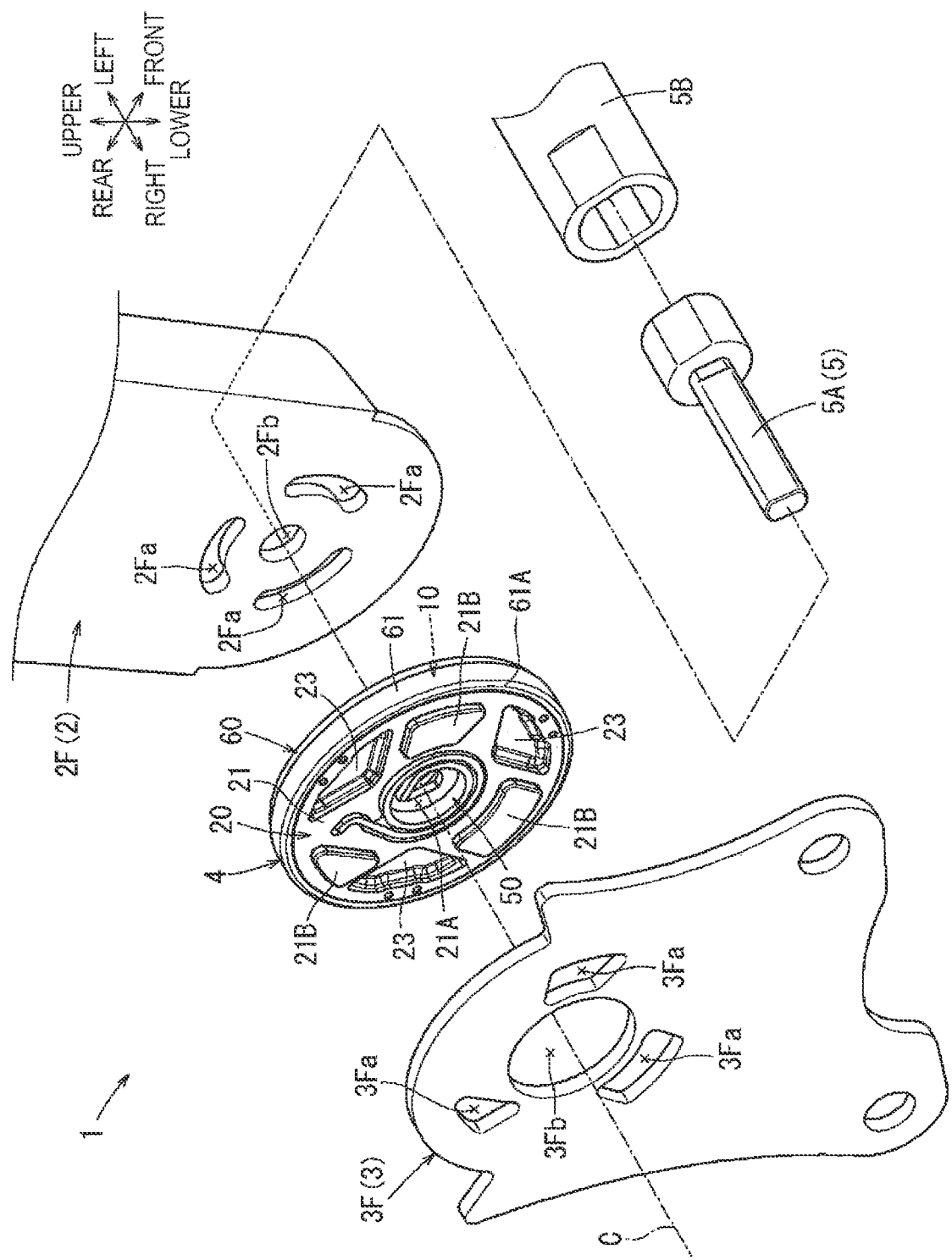
FIG. 2 is a partial exploded perspective view of FIG. 1.
Figure 3:
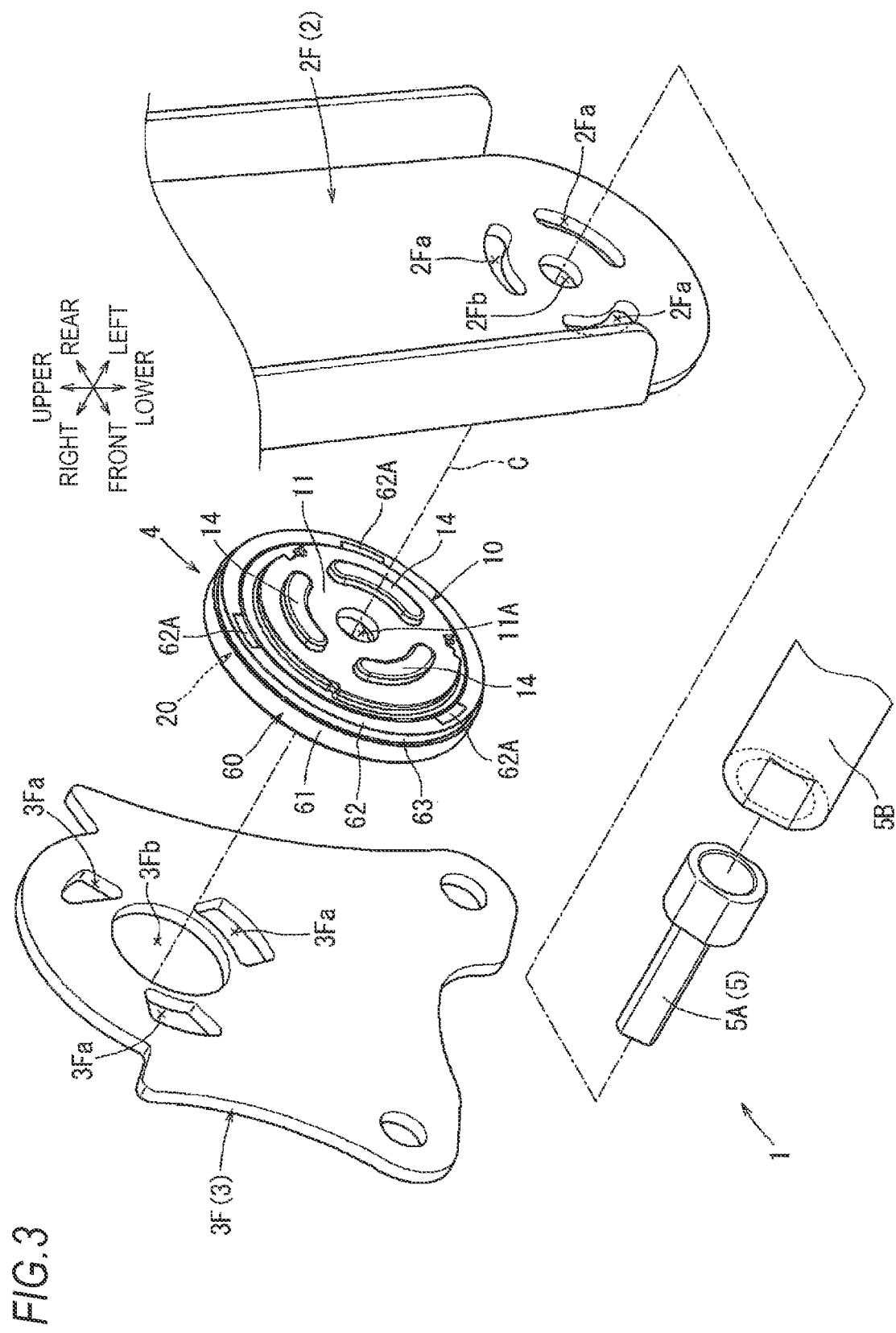
FIG. 3 is an exploded perspective view as viewed from a side opposite to FIG. 2.

Specifically, as shown in FIGS. 2 and 3, the seat reclining devices 4 are respectively provided between lower end portions of side frames 2F forming left and right side frames of the seat back 2 and reclining plates 3F connected to rear end portions of left and right side frames of the seat cushion 3 that are positioned on outer sides of the side frames 2F in the seat width direction, and are connected in a manner that allows or stops relative rotation thereof.

As shown in FIG. 1, the seat reclining devices 4 are normally held in the locked state in which the backrest angle of the seat back 2 is fixed. The seat reclining devices 4 can be adjusted to the unlocked state in which the backrest angle of the seat back 2 can be changed by pulling up a reclining lever 5 provided on a vehicle outer side (right side) of the seat cushion 3 (circled number 1 of FIG. 1), thereby simultaneously releasing the locked state of the seat reclining devices 4. Further, the seat reclining devices 4 are urged and returned to the locked state again when the operation on the reclining lever 5 is returned.

Return springs 6 that constantly apply a spring urging force to the seat back 2 in a forward-tilting rotation direction are respectively hooked between the side frames 2F on the left and right sides of the seat back 2 and the reclining plates 3F located on the outer sides of the side frames 2F. Due to the rotational urging force of the return springs 6, by releasing the fixed state of the backrest angle due to the seat reclining devices 4, the seat back 2 is raised to a position corresponding to the back of a seated occupant. The backrest angle of the seat back is freely adjusted in the front-rear direction in correspondence with front-rear tilting of the back of the seated occupant (circled number 2 of FIG. 1). In this way, by providing the return springs 6 that apply the urging forces in the forward-tilting rotation direction to the seat back 2, the backrest angle of the seat back 2 can be easily adjusted.

As shown in FIG. 21, the seat back 2 can rotate in a seat front-rear direction within a rotation region of about 180 degrees between a forward-tilting position Pa that is folded on an upper surface of the seat cushion 3 and a rearward-tilting position Pc that is tilted rearward in a substantially horizontal manner. The structure for locking the seat back 2 in the forward-tilting position Pa is formed by locking plates 2Fc, which are coupled to outer surface portions of the side frames 2F of the seat back 2, abutting against and being locked to front stoppers 3Fc protruding from front edge portions of the reclining plates 3F. The structure for locking the seat back 2 in the rearward-tilting position Pc is formed by the locking plates 2Fc, which are coupled to the outer surface portions of the side frames 2F of the seat back 2, abutting against and being locked to rear stoppers 3Fd protruding from rear edge portions of the reclining plates 3F. Here, the structure in which the locking plates 2Fc abut against and are locked to the rear stoppers 3Fd of the reclining frames 3F correspond to the "locking structure" of the present invention.

Here, of the above-described rotation region of the seat back 2, a rotation region of about 90 degrees of tilting from an initial lock position Pb, in which the seat back 2 is at a backrest angle of standing substantially vertically, to the rearward-tilting position Pc is set as a "lock region A1", in which the backrest angle of the seat back 2 is returned to the fixed state by releasing the operation of pulling up the reclining lever 5. A rotation region from a position in which the backrest angle of the seat back 2 is about 90 degrees of tilting from the initial lock position Pb to the forward-tilting position Pa is set as a "free region A2", in which the backrest angle of the seat back 2 is not fixed but maintained in a released state (state in which the lock is disabled) even when the operation of pulling up the reclining lever 5 is released.

The lock region A1 and the free region A2 are realized by the lock region A1 and the free region A2 set in the seat reclining device 4 to be described later, respectively. By setting the free region A2, when the reclining lever 5 is operated and the seat back 2 is tilted to a position where the seat back 2 enters the free region A2 in a state in which no person is seated in the seat 1, the seat back 2 is automatically tilted to the forward-tilting position Pa even when the operation of the reclining lever 5 is not continued.

Specifically, as shown in FIGS. 2 and 3, the seat reclining device 4 includes a ratchet 10 (see FIG. 2) integrally coupled to the outer surface portion of the side frame 2F on each side of the seat back 2, and a guide 20 (see FIG. 3) integrally coupled to an inner surface portion of the corresponding reclining plate 3F. The seat reclining device 4 fixes and releases the backrest angle of the seat back 2 by locking and releasing the relative rotation between the ratchet 10 and the guide 20.

<<Specific Configuration of Seat Reclining Device 4>>

Hereinafter, configurations of components of the pair of left and right seat reclining devices 4 will be described in detail. The seat reclining devices 4 have the same configurations that are bilaterally symmetrical to each other. Therefore, hereinafter, the configuration of the seat reclining device 4 disposed on the vehicle outer side (right side) shown in FIGS. 2 and 3 will be described in detail.

Figure 4:
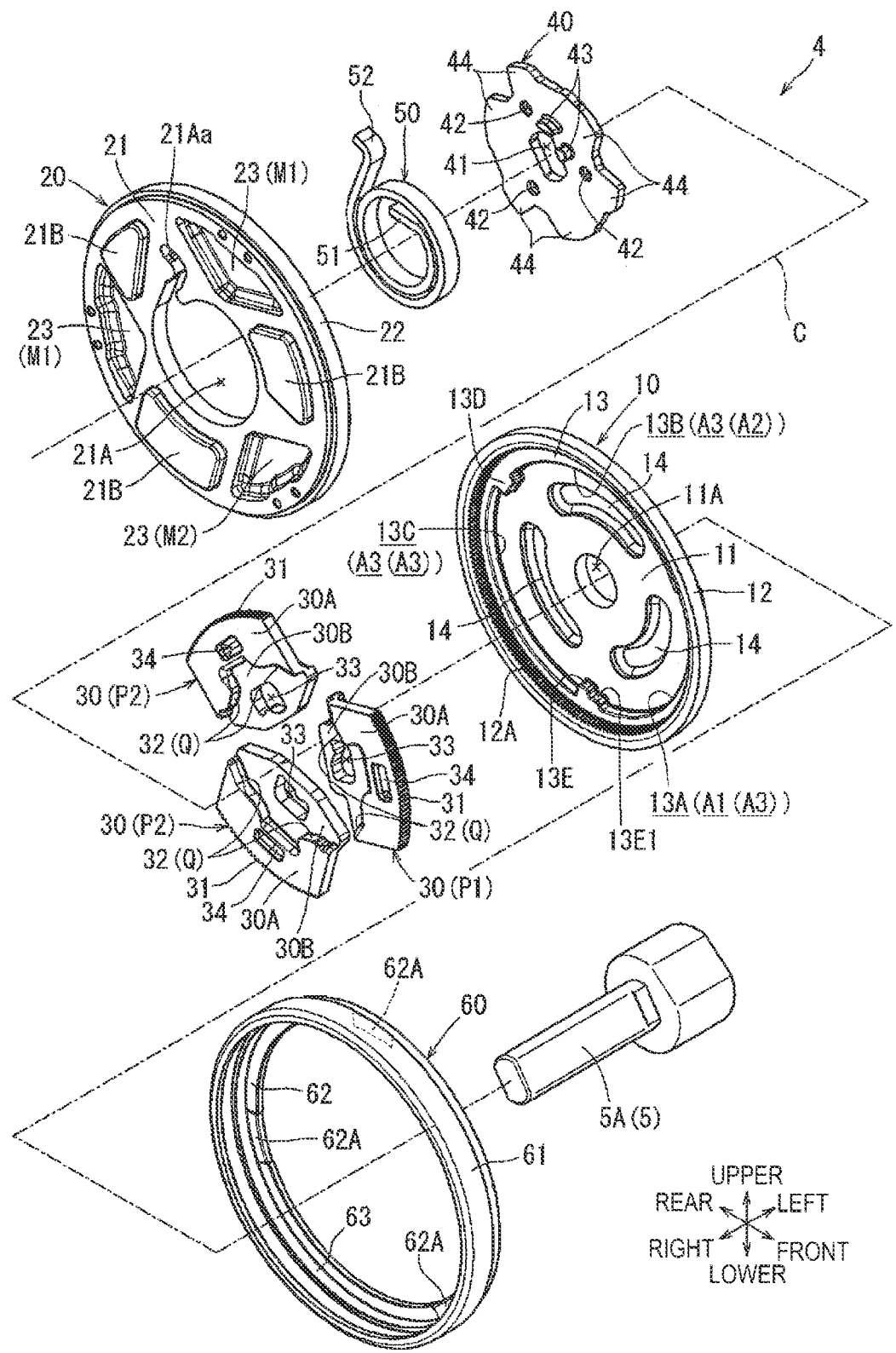
FIG. 4 is an exploded perspective view of the vehicle seat reclining device.
Figure 5:
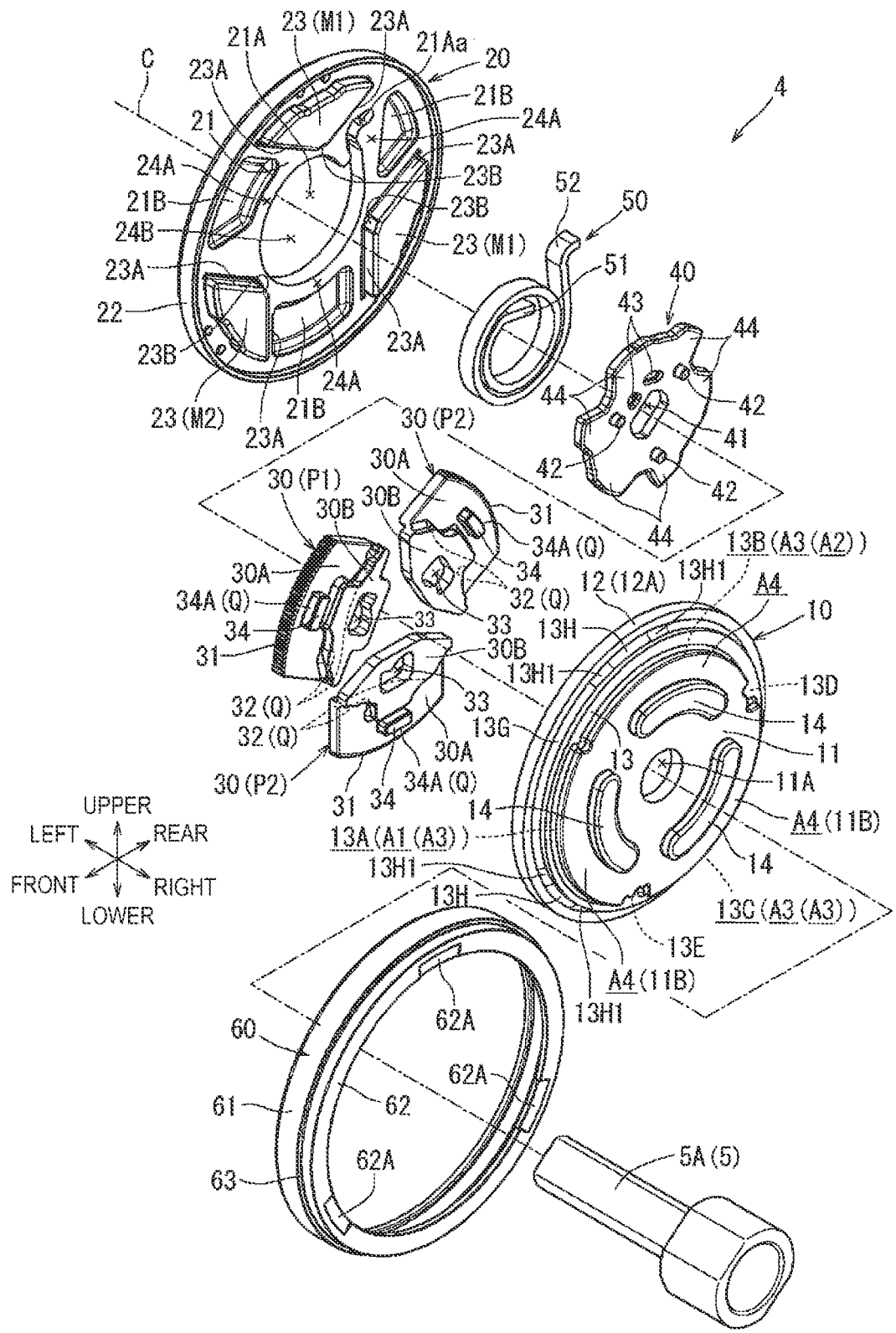
FIG. 5 is an exploded perspective view as viewed from a side opposite to FIG. 4.

As shown in FIGS. 4 and 5, the seat reclining device 4 includes the ratchet 10 and the guide 20 that are substantially disc-shaped and assembled together in an axial direction, three pawls 30 assembled therebetween, a rotary cam 40 that moves the pawls 30 inward or outward in a radial direction, a lock spring 50 (spiral spring) that urges the rotary cam 40 in a rotation direction of locking, and a substantially cylindrical outer circumferential ring 60 that is mounted spanning outer periphery portions of the ratchet 10 and the guide 20. The outer circumferential ring 60 functions as a holding member that holds the ratchet 10 and the guide 20 in a state of being assembled to each other in the axial direction.

Each of the ratchet 10, the guide 20, the three pawls 30, and the rotary cam 40 is hardened by quenching processing after press molding and has high structural strength. Hereinafter, specific configurations of the members constituting the seat reclining device 4 will be described in detail.

<<Ratchet 10>>

As shown in FIG. 4, the ratchet 10 is formed by cutting one metal plate member into a substantially disc shape and half-punching in the plate thickness direction (axial direction) in some positions. Specifically, a cylindrical portion 12 projecting in a substantially cylindrical shape in the axial direction as a direction of assembly to the guide 20 is formed at an outer circumferential edge portion of a disc body 11 of the ratchet 10. In detail, the cylindrical portion 12 is configured as a cylindrical portion on an outer circumferential side of a cylindrical shape projecting in a two-step manner obtained by half-punching the outer circumferential edge portion of the disc body 11. A cylindrical portion on an inner circumferential side thereof is configured as an intermediate cylindrical portion 13 projecting in the axial direction shorter than the cylindrical portion 12.

On the inner circumferential surface of the cylindrical portion 12, inner circumferential teeth 12A whose tooth surfaces face a radially inward side are formed continuously over an entire region in the rotation direction. The inner circumferential teeth 12A have a shape of tooth surfaces capable of being pressed from a radially inner side and meshing with outer circumferential teeth 31 formed on an outer circumferential surface portion of each pawl 30, which will be described later. Specifically, the inner circumferential teeth 12A are formed such that the inner teeth have tooth surface shapes arranged at regular intervals in the rotation direction at a pitch of 2 degrees.

An inner circumferential surface of the intermediate cylindrical portion 13 is formed with three regions (a first region 13A, a second region 13B, and a third region 13C) in which an inner diameter from a central portion (central axis C) and a length in the rotation direction are set individually, and a first convex portion 13D and a second convex portion 13E projecting radially inward from boundaries between these regions.

The first region 13A, the second region 13B, and the third region 13C are formed to have inner circumferential surface shapes that are curved so as to draw arcs on concentric circles around the central axis C of the ratchet 10. Specifically, as shown in FIG. 10, the first region 13A and the third region 13C have an inner circumferential surface shape of the same diameter slightly larger than that of the second region 13B.

Figure 10:
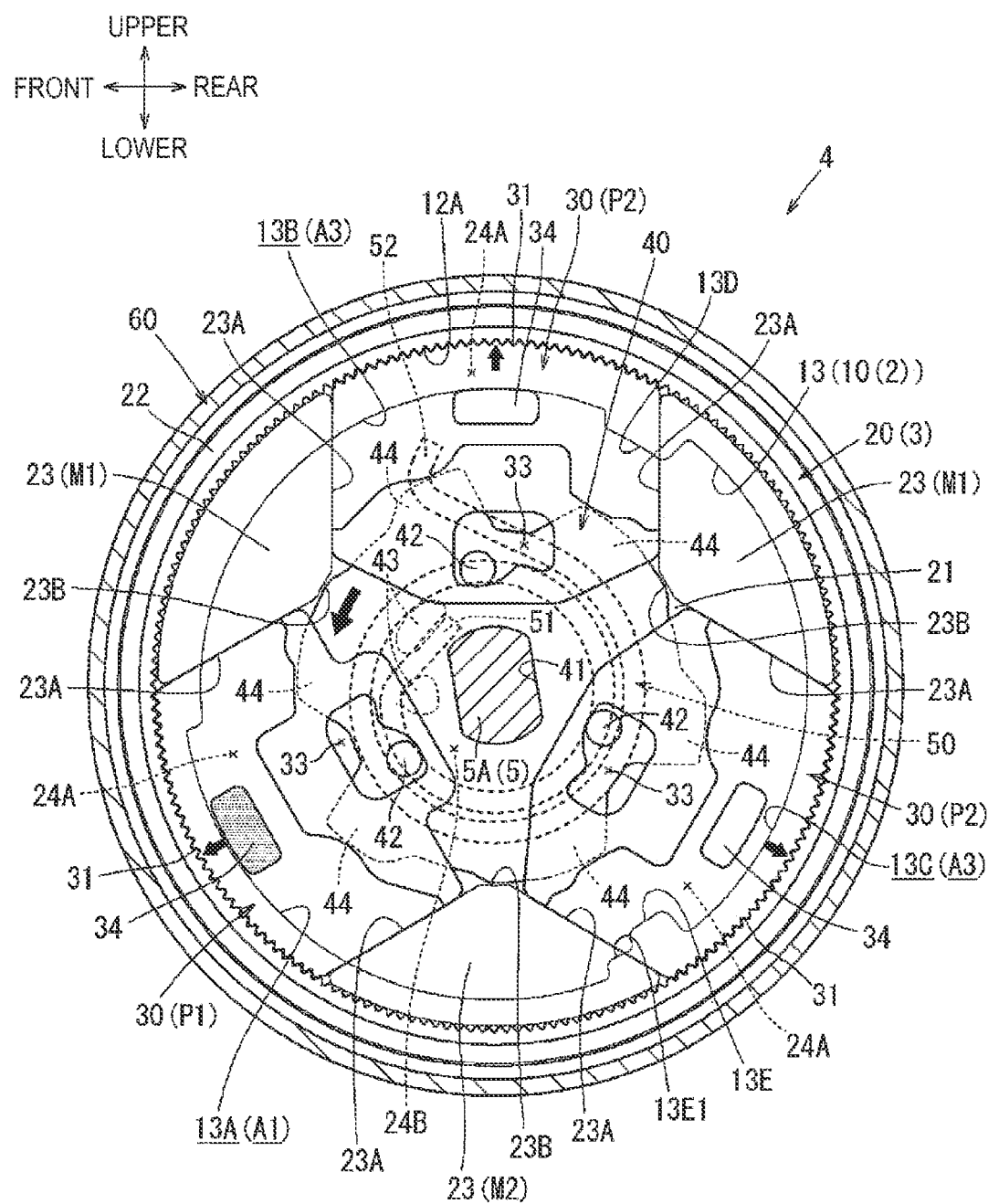
FIG. 10 is a cross-sectional view taken along line X-X of FIG. 8 showing a locked state of the vehicle seat reclining device.

As shown in FIG. 10, (a) of FIG. 17, and (a) of FIG. 18, when the ratchet 10 is at a rotation angle where the first region 13A overlaps with a main pawl P1 that is one of the three pawls 30 to be described later in the rotation direction, the first region 13A constitutes the lock region A1 in which the main pawl P1 is allowed to mesh with the inner circumferential teeth 12A. When the main pawl P1 is arranged in a manner overlapping with the first region 13A in the rotation direction, the second region 13B and the third region 13C function as other regions A3 that are arranged in a manner overlapping with the remaining two sub pawls P2 in the rotation direction. The other regions A3 are regions that allow meshing of the sub pawls P2 toward the inner circumferential teeth 12A of the ratchet 10. Here, the main pawl P1 corresponds to the "particular pawl" of the present invention. The sub pawls P2 corresponds to the "another pawl" of the present invention.

Figure 12:
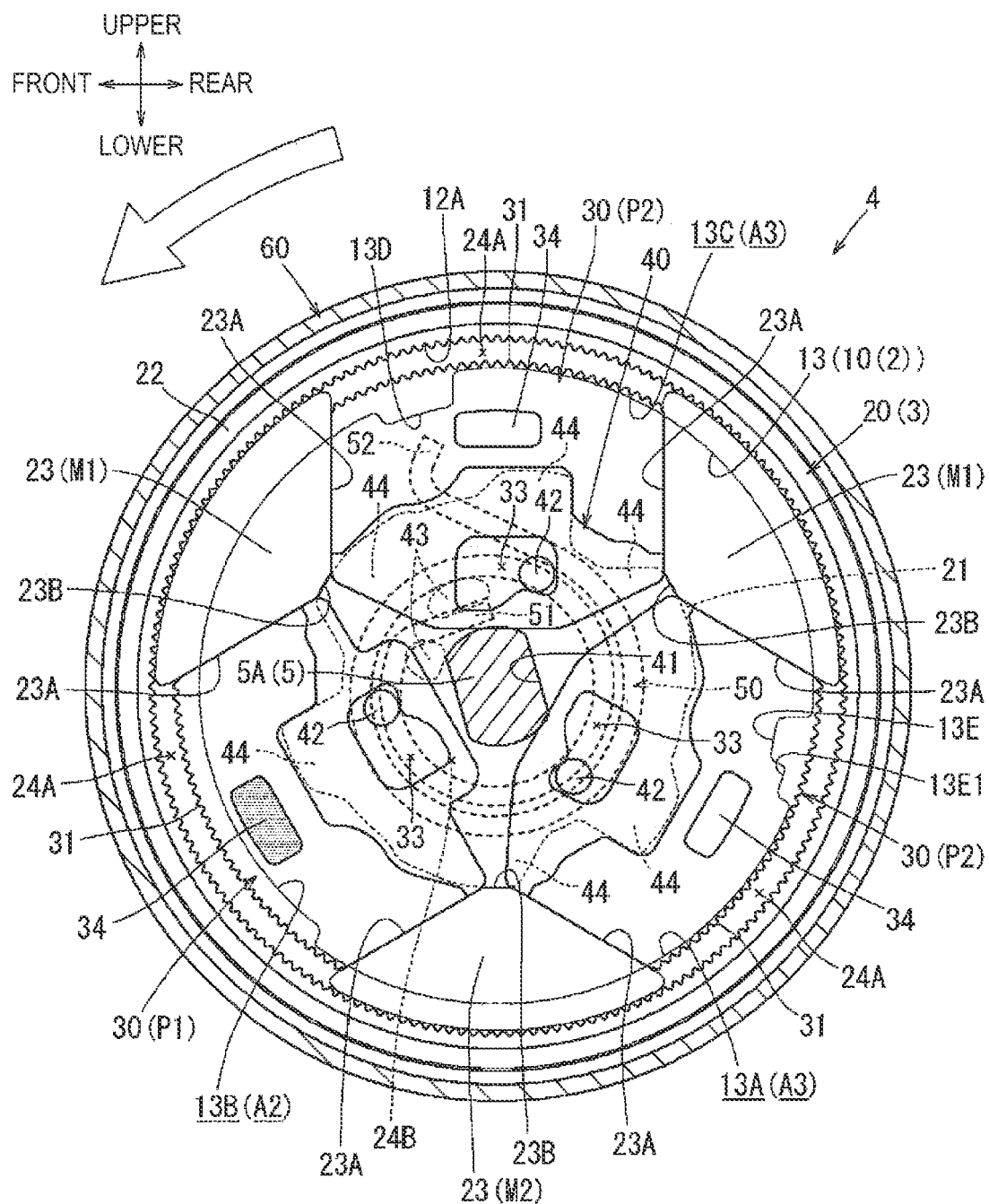
FIG. 12 is a cross-sectional view showing a state in which a ratchet is turned from FIG. 11 to a free region.
Figure 13:
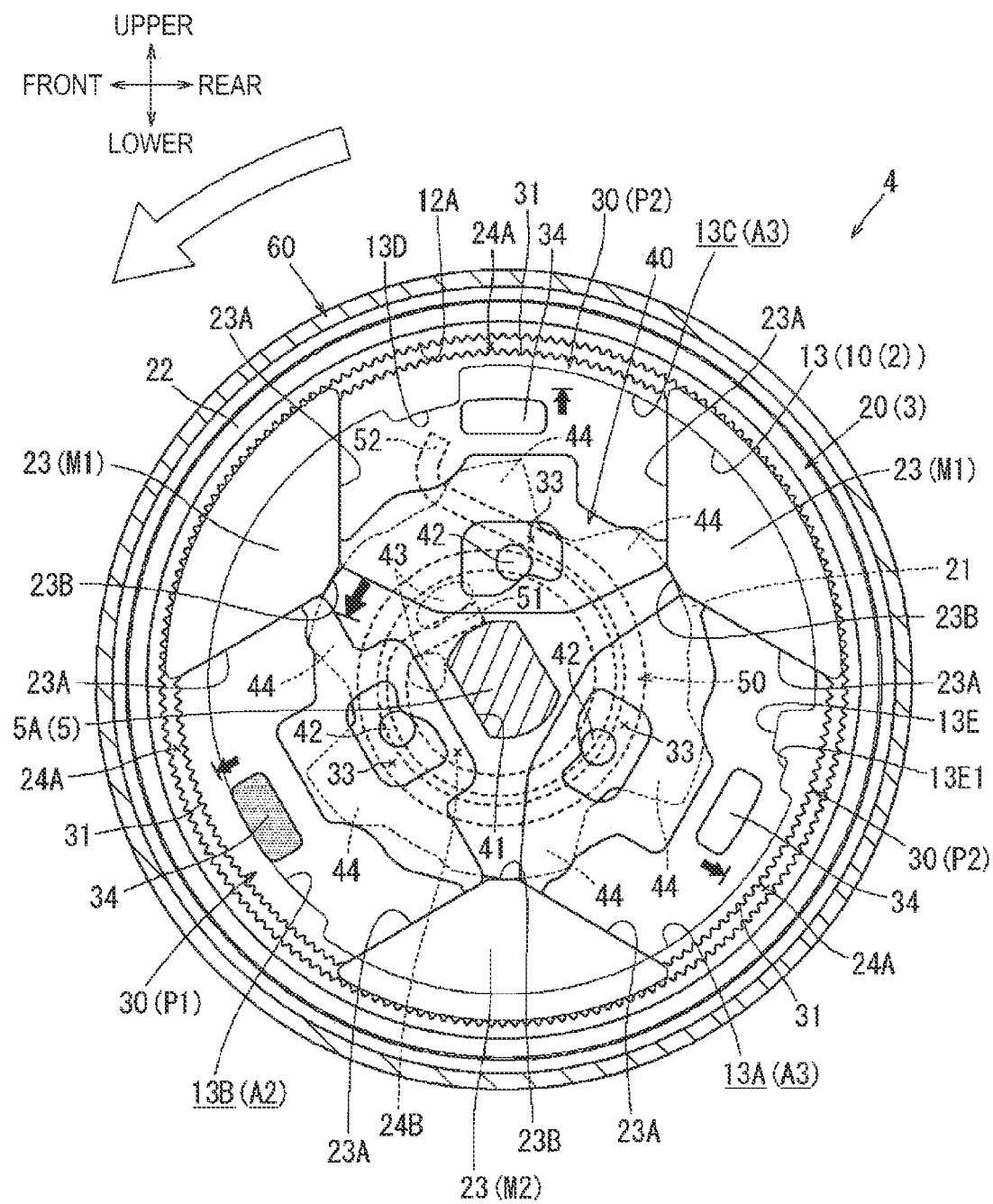
FIG. 13 is a cross-sectional view showing a state in which locking operation of the vehicle seat reclining device is prevented from FIG. 12.

On the other hand, when the ratchet 10 is at a rotation angle where the second region 13B overlaps with the main pawl P1 in the rotation direction as shown in FIG. 12, the second region 13B constitutes the free region A2 in which the main pawl P1 rides on the inner circumferential surface (ride-up surface) and the meshing thereof with the inner circumferential teeth 12A of the ratchet 10 is blocked, as shown in FIG. 13, (b) of FIG. 17, and (b) of FIG. 18. At this time, the third region 13C and the first region 13A function as the other regions A3 that are arranged in a manner overlapping with the remaining two sub pawls P2 in the rotation direction. The other region A3 is a region for releasing movement of the sub pawls P2 whose locking operation is prevented halfway in synchronization with movement of the main pawl P1.

That is, the intermediate cylindrical portion 13 of the ratchet 10 constitutes the lock region A1 that allows the locking operation of the main pawl P1 in the first region 13A thereof as shown in FIG. 10 (see (a) of FIG. 17 and (a) of FIG. 18). Further, the intermediate cylindrical portion 13 constitutes the free region A2 that blocks the locking operation of the main pawl P1 and allows the ratchet 10 to rotate freely in the rotation direction while holding the main pawl P1 in the unlocked state in the second region 13B as shown in FIG. 13 (see (b) of FIG. 17 and (b) of FIG. 18).

As shown in FIG. 10, (a) of FIG. 17, and (a) of FIG. 18, when the main pawl P1 is arranged in a manner overlapping with the first region 13A (lock region A1) in the rotation direction, the second region 13B and the third region 13C of the intermediate cylindrical portion 13 respectively function as the other regions A3 to allow the remaining two sub pawls P2 to perform the locking operation in synchronization with the main pawl P1. Further, as shown in FIG. 13, (b) of FIG. 17, and (b) of FIG. 18, when the main pawl P1 is arranged in a manner overlapping with the second region 13B (free region A2) in the rotation direction, the third region 13C and the first region 13A of the intermediate cylindrical portion 13 respectively function as the other regions A3 to release the remaining two sub pawls P2 from the blocking of the locking operation in synchronization with the main pawl P1.

In this way, the intermediate cylindrical portion 13 of the ratchet 10 controls allowance and prevention of the locking operation of the main pawl P1 by the first region 13A and the second region 13B. At this time, the remaining two regions respectively function as the other regions A3 in which the sub pawls P2 are located, so as to release movement of the sub pawls P2 that is in synchronization with movement of the main pawl P1.

As shown in (c) of FIG. 17 and (c) of FIG. 18, when the main pawl P1 moves from the lock region A1 (first region 13A) to the free region A2 (second region 13B) by the rotation of the ratchet 10, the main pawl P1 may abut against a step between the first region 13A and the second region 13B in the rotation direction in a state in which the main pawl P1 is halfway pressed outward in the radial direction. In this case, the first convex portion 13D and the second convex portion 13E respectively abut against the corresponding sub pawls P2 in the rotation direction at the same time, so that the load is not only concentrated in the main pawl P1, but is also dispersed to the other two sub pawls P2.

Specifically, the first convex portion 13D and the second convex portion 13E are formed in positions where, when a ride-up 34 of the main pawl P1 abuts against the step between the first region 13A and the second region 13B in the rotation direction due to the rotation of the ratchet 10, ride-up protrusions 34 of the remaining two sub pawls P2 can abut against the first convex portion 13D and the second convex portion 13E in the same rotation direction at the same time. Configurations of the ride-up protrusions 34 will be described in detail later.

As shown in FIG. 14, (d) of FIG. 17, and (d) of FIG. 18, the second convex portion 13E protrudes on a starting side of the lock region A1 (first region 13A) on the intermediate cylindrical portion 13, that is, an end portion of the lock region A1 on the side opposite to the side next to the free region A2 (second region 13B). The second convex portion 13E is formed in an end position where the second convex portion 13E may overlap with the ride-up protrusion 34 of the main pawl P1 in the rotation direction as shown in FIG. 14, (d) of FIG. 17, and (d) of FIG. 18 when the seat back 2 is tilted to a starting of the lock region A1, that is, the rearward-tilting position Pc as shown in FIG. 21.

That is, as shown in FIG. 21, when the seat back 2 is tilted to the rearward-tilting position Pc, the locking plate 2Fc abuts against and is locked to the rear stopper 3Fd of the reclining plate 3F. At this time, when the ride-up protrusion 34 of the main pawl P1 shown in FIG. 14 abuts against the second convex portion 13E in the rotation direction before the locking plate 2Fc abuts against the rear stopper 3Fd of the reclining plate 3F due to the fitting of the seat 1 and the seat reclining device 4, a large load is applied to the seat reclining device 4. Therefore, in order to prevent such a situation, the second convex portion 13E is formed with a relief concave portion 13E 1 that releases the abutment of the ride-up protrusion 34 of the main pawl P1 against the second convex portion 13E in the rotation direction. Here, the rearward-tilting position Pc corresponds to the "predetermined position" of the present invention. The second convex portion 13E correspond to the "convex portion" of the present invention.

As shown in FIG. 33, the relief concave portion 13E1 is formed in a shape in which a corner portion of the second convex portion 13E on a clockwise side in the drawing is thinned in a substantially rectangular shape. When the seat back 2 is tilted to the rearward-tilting position Pc and the locking plate 2Fc abuts against and is locked to the rear stopper 3Fd of the reclining plate 3F as shown in FIG. 21 due to the dimensional variation due to the fitting, even when the ride-up protrusion 34 of the main pawl P1 overlaps with the second convex portion 13E in the rotation direction as shown in FIG. 33, the relief concave portion 13E1 receives the ride-up protrusion 34 so that the up protrusion 34 does not abut against the second convex portion 13E in the rotation direction. Specifically, the relief concave portion 13E1 receives the ride-up protrusion 34 in a state in which a gap Y in the rotation direction is defined between the relief concave portion 13E1 and a side surface of the ride-up protrusion 34 on a counterclockwise side in the drawing.

When the ride-up protrusion 34 of the main pawl P1 that is received in the relief concave portion 13E1 is pressed outward in the radial direction, the ride-up protrusion 34 rides on an inner circumferential surface of the relief concave portion 13E1 so that the main pawl P1 is prevented from meshing with the inner circumferential teeth 12A of the ratchet 10. As a result, the locking operation of the seat reclining device 4 is prevented in a rotation position in which the ride-up protrusion 34 of the main pawl P1 enters the relief concave portion 13E1 (rotation position beyond the lock region A1).

As shown in FIGS. 4 and 5, a through hole 11A penetrating in a round hole shape is formed at a central portion (position on the central axis C) of the disc body 11 of the ratchet 10. In the through hole 11A, an operation pin 5A inserted into a central portion (position on the central axis C) of the rotary cam 40 to be described later is inserted in a freely rotatable state from the outside in the axial direction. Further, as shown in FIG. 5, on an outer surface of the disc body 11 of the ratchet 10 described above, dowels 14 protruding in the axial direction in an arc shape are respectively formed at three positions in the rotation direction around the central portion (central axis C) of the outer surface.

The dowels 14 are formed respectively in formation regions in the rotation direction in which the first region 13A, the second region 13B, and the third region 13C of the intermediate cylindrical portion 13 are formed. As shown in FIG. 3, the ratchet 10 configured as above is integrally coupled to the side frame 2F of the seat back 2 by setting the outer surface of the disc body 11 to the outer surface of the side frame 2F of the seat back 2 in a surface contact manner, and welding contact portions therebetween (welding locations W).

Specifically, the three dowels 14 formed on the outer surface of the disc body 11 of the ratchet 10 are set in a state respectively fitted into three corresponding fitting holes 2Fa formed in the side frame 2F of the seat back 2 in a penetrating manner in a substantially arc shape. The ratchet 10 is coupled to the side frame 2F of the seat back 2 by joining circumferential regions of the fitted locations (coupling regions A4) to the side frame 2F in a surface contact state by laser welding (welding locations W)

Figure 7:
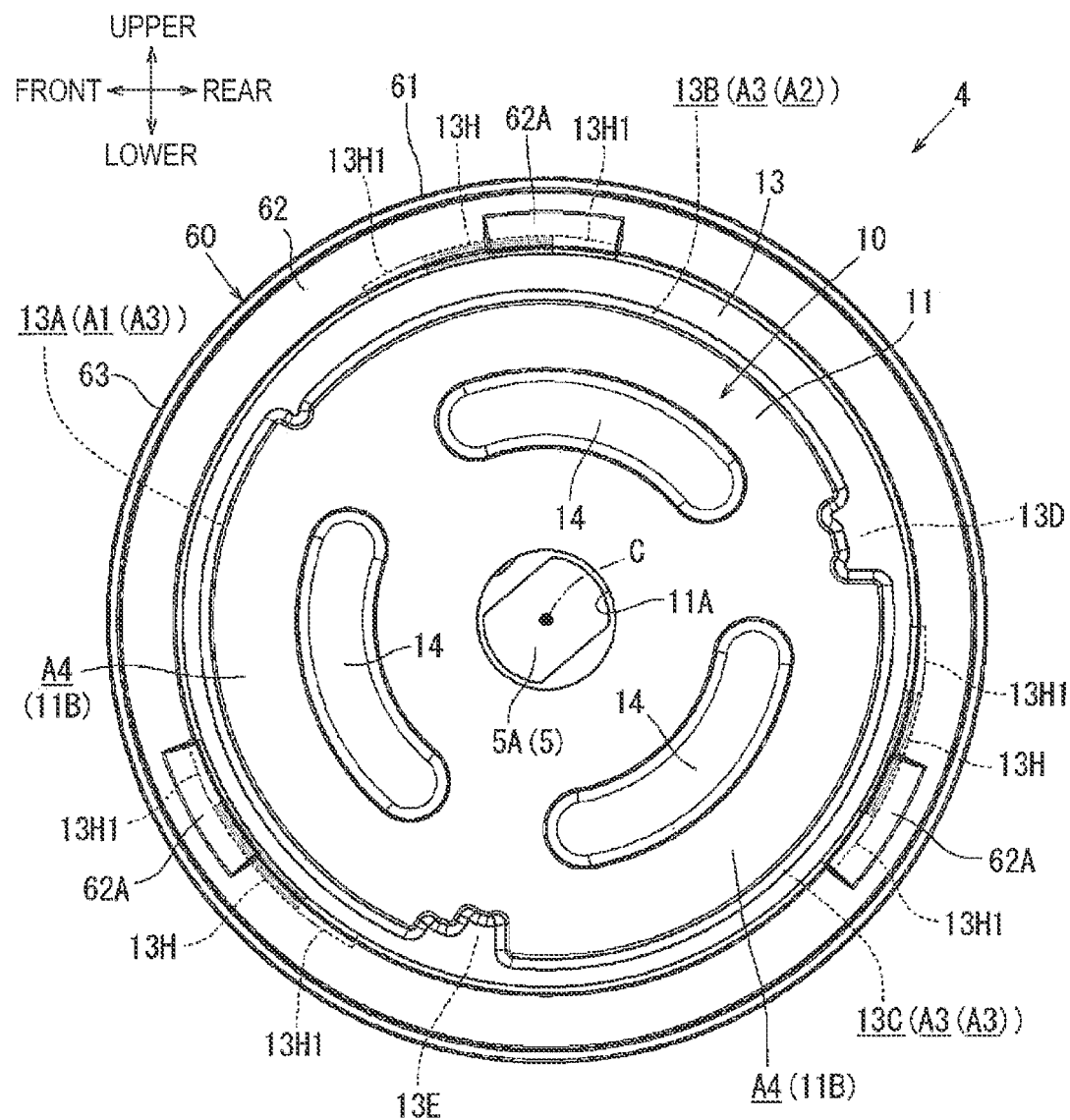
FIG. 7 is an inner side view of the vehicle seat reclining device.
Figure 8:
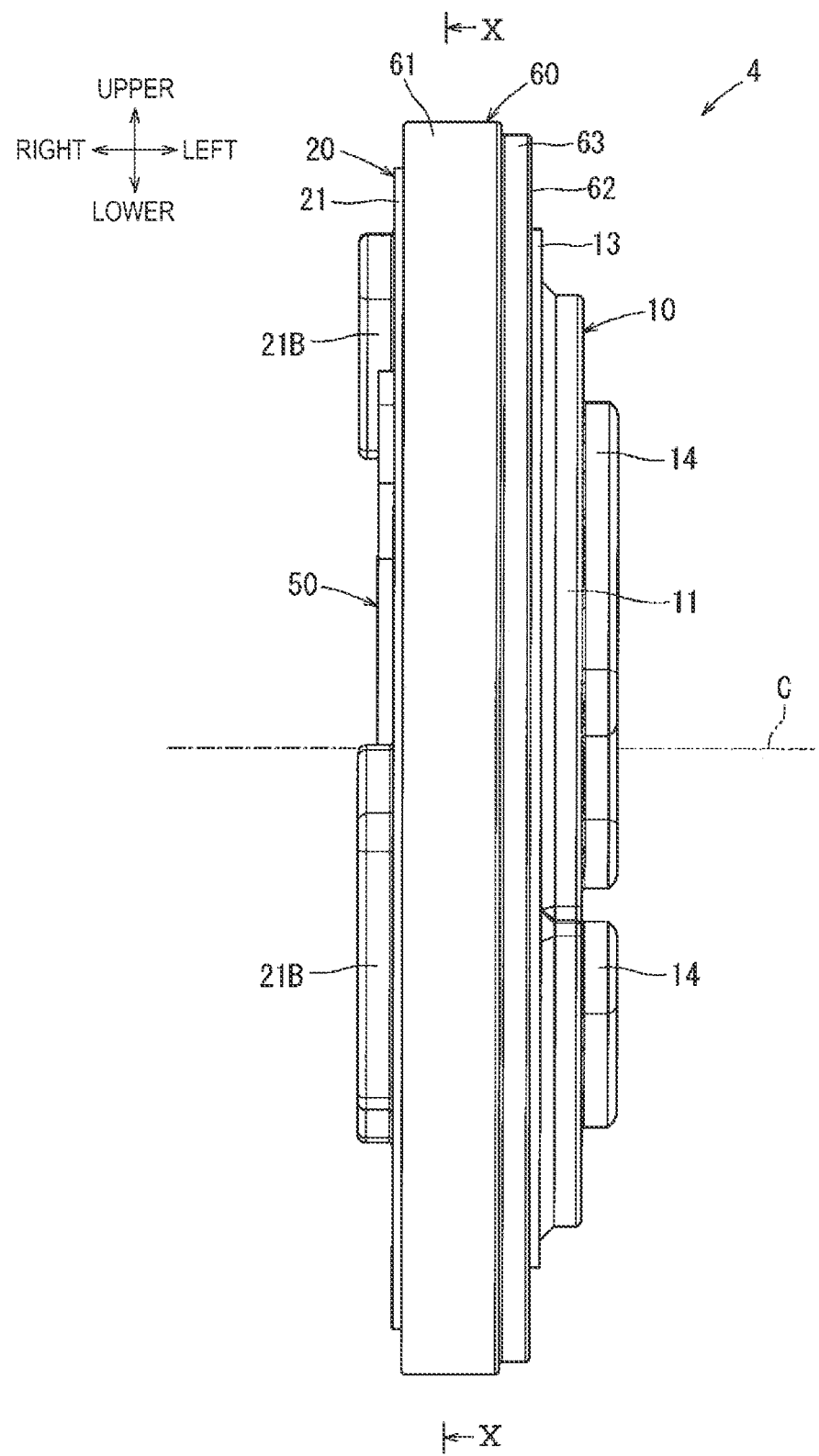
FIG. 8 is a front side view of the vehicle seat reclining device.

More specifically, on the outer surface of the disc body 11 of the ratchet 10, the coupling regions A4 in surface contact with and laser-welded to the side frame 2F are formed in regions on the radially outer side and on both sides in the rotation direction of regions in which the three dowels 14 are formed. As shown in FIG. 7, due to the shape of the intermediate cylindrical portion 13 formed on an outer circumferential edge of the coupling regions A4, the coupling regions 4A formed in formation positions of the first region 13A and the third region 13C each have an expanded surface portion 11B having a larger area in the radial direction as compared with the coupling region 4A formed in a formation position of the second region 13B.

That is, as described above the first region 13A and the third region 13C formed on the intermediate cylindrical portion 13 are formed to have a shape expanded radially outward relative to the second region 13B. Therefore, the coupling regions 4A formed in the formation positions of the first region 13A and the third region 13C have an expanded area in the radial direction as compared with the coupling region 4A formed in the formation position of the second region 13B. According to the above configuration, the outer surface of the disc body 11 of the ratchet 10 is firmly welded to the side frame 2F in a state in which the two coupling regions A4 each having the expanded surface portion 11B, which are in the positions in which the first region 13A and the third region 13C are formed, are in contact with the side frame 2F in a manner wider toward the radially outer side.

The welding of the ratchet 10 to the side frame 2F is performed in a manner such that each dowel 14 is enclosed in a C shape spanning from the radially outer side to both the side regions in the rotation direction and a weld bead enters therein (welding locations W). The side frame 2F is formed with a penetrating hole 2Fb through which the operation pin 5A passing through the through hole 11A formed in the central portion (position on the central axis C) of the ratchet 10 can pass to the axially outer side.

<<Guide 20>>

As shown in FIG. 5, the guide 20 is formed by cutting a metal plate member into a substantially disk shape having an outer diameter slightly larger than that of the ratchet 10 and half-punching portions of the metal plate member in the plate thickness direction (axial direction). Specifically, a cylindrical portion 22 projecting in a substantially cylindrical shape toward the axial direction as a direction of assembly to the ratchet 10 is formed at an outer circumferential edge portion of a disc body 21 of the guide 20.

Figure 9:
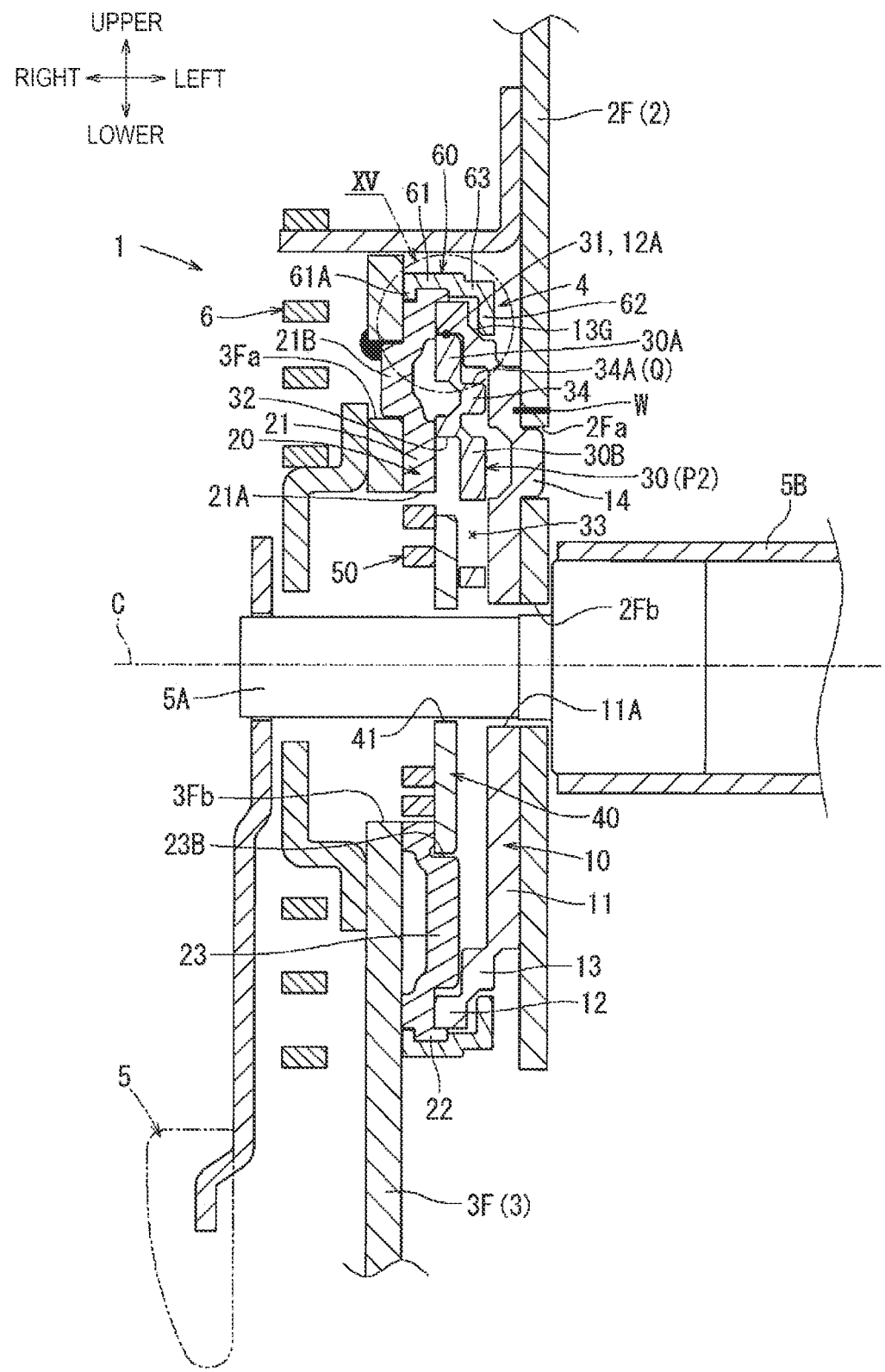
FIG. 9 is a cross-sectional view taken along line IX-IX in FIG. 1.

The cylindrical portion 22 has an inner diameter dimension slightly larger than an outer diameter dimension of the cylindrical portion 12 of the ratchet 10. Specifically, the cylindrical portion 22 has a thickness in the radial direction smaller than the plate thickness of an outer circumferential ring 60 to be described later (see FIG. 15). More specifically, the cylindrical portion 22 has such a small thickness in the radial direction that an outer circumferential surface thereof is located radially inward of an outer circumferential surface of a stepped portion 63 of the outer circumferential ring 60 to be described later. As shown in FIG. 9, the guide 20 is set in a state where the cylindrical portion 12 of the ratchet 10 is inserted into the cylindrical portion 22 in the axial direction.

As a result, the guide 20 is assembled to the ratchet 10 in a state of supporting each other from the inner and outer sides so as to be rotatable relative to each other, in a state in which the cylindrical portions 22, 12 thereof are loosely fitted to each other on the radially inner and outer sides. The outer circumferential ring 60 to be described later is installed in a state of crossing the cylindrical portion 22 of the guide 20 and the cylindrical portion 12 of the ratchet 10 from an outer circumferential side, and thereby the guide 20 is assembled to the ratchet 10 via the outer circumferential ring 60 in a state in which the guide 20 is prevented from coming off in the axial direction (see FIGS. 2 to 3 and 6 to 9).

As shown in FIG. 5, on an inner surface of the disc body 21 of the guide 20, guide walls 23 protruding in a substantially fan shape in the axial direction, which is the assembling direction to the ratchet 10, are extruded in a half-punched shape in three positions in the rotation direction. Outer circumferential surfaces of the guide walls 23 on radially outer sides curve in an arc shape on the same circumference around the central axis C of the guide 20. The guide walls 23 are loosely fitted into the cylindrical portion 12 of the ratchet 10 assembled into the cylindrical portion 22 of the guide 20.

The guide walls 23 define concave pawl accommodating grooves 24A in regions between the guide walls 23 in the rotation direction on an inner surface of the disc body 21 of the guide 20. The pawl accommodating grooves 24A allow the three pawls 30, which will be described later, to be slidable radially inward and outward. A cam accommodating groove 24B is formed in a central region on the inner surface of the disc body 21 surrounded by the guide walls 23. The cam accommodating groove 24B allows the rotary cam 40 to be axially rotatable.

Figure 11:
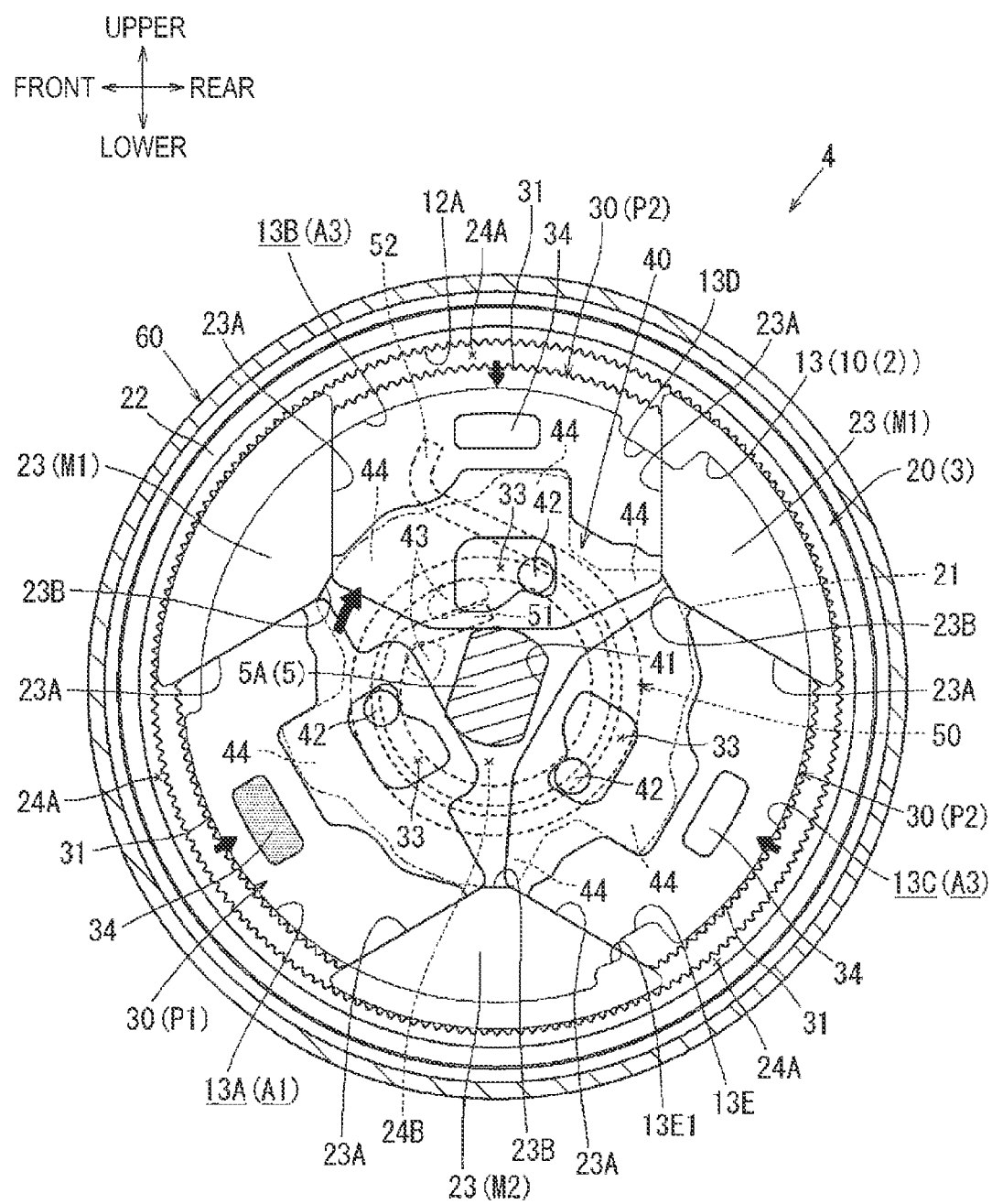
FIG. 11 is a cross-sectional view corresponding to FIG. 10 showing an unlocked state of the vehicle seat reclining device.

As shown in FIGS. 10 and 11, the guide walls 23 abut against the corresponding pawls 30 set in the pawl accommodating grooves 24A from both sides in the rotation direction against corresponding regulating surfaces 23A which are two side surfaces in the rotation direction that face the corresponding pawl accommodating grooves 24A. Accordingly, the guide walls 23 guide the corresponding pawls 30 in a manner supporting the pawls 30 from both sides in the rotation direction so that the pawls 30 slide radially inward and outward only.

The guide walls 23 further abut against the rotary cam 40 set in the cam accommodating groove 24B from the radially outer side against support surfaces 23B which are radially inner circumferential surfaces that face the cam accommodating groove 24B. Thereby, the guide walls 23 support the rotary cam 40 from the radial outer side so that the rotary cam 40 is rotatable around the central portion (position on the central axis C) on the disc body 21 of the guide 20.

In addition, a through hole 21A is formed in the central portion (position on the central axis C) of the disc body 21 of the guide 20. A lock spring 50 described later inside is set in the through hole 21A. The through hole 21A is formed with an elongated hooking hole 21Aa extending radially outward. An outer end portion 52 of the lock spring 50 set in the through hole 21A is fitted into the hooking hole 21Aa in the axial direction and is integral with the hooking hole 21Aa in the rotation direction.

As shown in FIG. 4, on the outer surface of the disc body 21 of the guide 20, dowels 21B are formed at three positions in the rotation direction so as to protrude in a substantially cylindrical shape extruded in the axial direction. The dowels 21B are formed in a manner extruded in the axial direction respectively in regions on the back sides of the pawl accommodating grooves 24A on the outer surface of the disc body 21.

As shown in FIG. 2, the dowels 21B projecting from the outer surface of the disc body 21 are fitted into corresponding fitting holes 3Fa formed in the reclining plate 3F and welded, so that the guide 20 is firmly and integrally coupled to the reclining plate 3F. The reclining plate 3F is formed with a penetrating hole 3Fb through which the operation pin 5A passing through the through hole 21A formed in the central portion (position on the central axis C) of the guide 20 can pass to the axially outer side.

<<Pawl 30>>

As shown in FIGS. 4 and 5, the three pawls 30 are each formed by cutting one metal plate member into a substantially rectangular shape and half-punching portions of the metal plate member in the plate thickness direction (axial direction). Specifically, each of the pawls 30 has a shape in which an offset surface portion 30B forming a region on a radially inner circumferential side thereof is extruded in a half-punched manner by substantially a plate thickness in the axial direction that is the direction of assembly to the ratchet 10 with respect to a body surface portion 30A forming a region on an outer circumferential side.

Further, a specific one among the three pawls 30 is configured as the main pawl P1 in a shape partially different from and functionally distinguished from the other two sub pawls P2. Specific configurations thereof will be described in detail below.

As shown in FIGS. 10 and 11, the pawls 30 are respectively accommodated in the pawl accommodating grooves 24A formed on the inner surface of the disc body 21 of the guide 20. With such setting, the pawls 30 are supported in a planar shape from both sides in the rotation direction by the regulating surfaces 23A of the guide walls 23 facing the pawl accommodating grooves 24A from both sides in the rotation direction. As a result, the pawls 30 are supported to be movable only radially inward and outward along the regulating surfaces 23A.

Specifically, as shown in FIG. 9, in the state where the pawls 30 are respectively set in the pawl accommodating grooves 24A, the body surface portions 30A thereof abut against the inner surface of the disc body 21 of the guide 20. Thus, each pawl 30 faces the inner circumferential teeth 12A of the cylindrical portion 12 of the ratchet 10 assembled in the cylindrical portion 22 of the guide 20 in the radial direction at a position radially outer than the body surface portion 30A. The offset surface portion 30B of each pawl 30 is spaced apart in the axial direction from the inner surface of the disc body 21 of the guide 20, and overlaps the intermediate cylindrical portion 13 of the ratchet 10 in the axial direction.

As shown in FIG. 4, on an outer circumferential surface on a radially outer side of the body surface portion 30A of each pawl 30, outer circumferential teeth 31 whose tooth surfaces face the radially outer side are formed continuously over an entire region in the rotation direction. The outer circumferential surface on the radially outer side of each pawl 30 on which the outer circumferential teeth 31 are formed is formed in a convex curved surface shape along the inner circumferential surface of the cylindrical portion 12 on which the inner circumferential teeth 12A of the ratchet 10 are formed.

According to the above configuration, as shown in FIG. 10, the outer circumferential teeth 31 of the pawls 30 are pressed against the inner circumferential teeth 12A of the ratchet 10 from the radially inner side so as to be meshed with the inner circumferential teeth 12A of the ratchet 10 as a whole. Similar to the inner circumferential teeth 12A of the ratchet 10 to be meshed, the outer circumferential teeth 31 of the pawls 30 are formed such that the tooth surfaces thereof are arranged at regular intervals in the rotation direction at a pitch of 2 degrees.

More strictly, however, as shown in FIG. 10, each of the outer circumferential teeth 31 of each pawl 30 are formed in shape such that the tooth surface at the center in the rotation direction bites deepest into the inner circumferential teeth 12A of the ratchet 10 in a meshed manner, and that has a tooth height gradually reduced so as to bite into the inner circumferential teeth 12A of the ratchet 10 shallower toward both end sides in the rotation direction. According to the above configuration, in the pawls 30, not only the tooth surfaces at the center that are directly oriented to the advancing direction of the pawl 30, but also the other tooth surfaces from the center toward both end sides in the rotation direction that are oriented to directions inclined to directions different from the advancing direction, can be appropriately meshed with the corresponding tooth surfaces of the inner circumferential teeth 12A of the ratchet 10 without being caught upon radial outward movement of the pawls 30. Since the specific tooth surface shape of the outer circumferential teeth 31 is the same as that disclosed in JP-A-2015-29635, detailed description thereof will be omitted.

As shown in FIG. 9, the rotary cam 40 to be described later, which is set at the central portion (position on the central axis C) of the guide 20, faces the body surface portions 30A in the radial direction in a region on an inner circumferential side of the body surface portions 30A of the pawls 30. By such setting, the pawls 30 are provided in a state in which the body surface portions 30A face the rotary cam 40 in the radial direction and the offset surface portions 30B overlap with the rotary cam 40 in the axial direction.

As shown in FIG. 5, inner circumferential surface portions of the body surface portions 30A of the pawls 30 are formed with pressed surface portions 32. The pressed surface portions 32 face the rotary cam 40 in the radial direction and are pressed radially outward from the inner side with the rotation of the rotary cam 40. Pull-in holes 33 pass in the axial direction through intermediate portions of the offset surface portions 30B of the pawls 30. The pull-in holes 33 are operated in such a way that pull-in pins 42 formed in corresponding three positions of the rotary cam 40 are inserted into the intermediate portions of the offset surface portions 30B and are pulled radially inward with the rotation of the rotary cam 40. Further, intermediate portions of the body surface portions 30A of the pawls 30 are formed with the ride-up protrusions 34 extruded in a half-punched manner in the axial direction identical to the offset surface portions 30B.

As shown in FIG. 10, when the rotary cam 40 is rotated in the counterclockwise direction in the drawing by a spring biasing force of the lock spring 50, which is to be described later and is hooked between the rotary cam 40 and the guide 20, the pressed surface portions 32 of the pawls 30 are pressed outward from the radially inner side by corresponding pressing portions 44 formed on an outer circumferential surface portion of the rotary cam 40. Due to the pressing, the outer circumferential teeth 31 of the pawls 30 are pressed against and meshed with the inner circumferential teeth 12A of the ratchet 10, and are held in the same meshed state (locked state). Accordingly, the pawls 30 are integrally coupled to the ratchet 10 in the rotation direction, and the relative rotation between the ratchet 10 and the guide 20 is locked via the pawls 30. Specifically, due to the meshing in the radial direction of the pawls 30, the ratchet 10 and the guide 20 are locked to each other in the radial direction as well in a manner such that rattling is eliminated.

As shown in FIG. 11, when the rotary cam 40 is rotated in the clockwise direction in the drawing against the spring urging force of the lock spring 50 upon operation on the reclining lever 5, the pull-in holes 33 of the pawls 30 are pulled radially inward by the corresponding pull-in pins 42 of the rotary cam 40 inserted therein. Due to the pull-in, the outer circumferential teeth 31 of the pawls 30 are disengaged from the meshing state with the inner circumferential teeth 12A of the ratchet 10, and are held in the same disengaged state (unlocked state). Accordingly, a rotation locked state between the ratchet 10 and the guide 20 is released.

As shown in FIG. 9, the ride-up protrusion 34 of each pawl 30 is extruded in a half-punched manner to substantially the same position in the axial direction identical to the offset surface portion 30B of the pawl 30, and an outer circumferential surface portion 34A thereof faces the inner circumferential surface of the intermediate cylindrical portion 13 of the ratchet 10 in the radial direction. As shown in FIG. 10, (a) of FIG. 17 and (a) of FIG. 18, when the rotational position of the ratchet 10 with respect to the guide 20 is in the lock region A1, even if the pawls 30 are pressed radially outward by the rotary cam 40, the ride-up protrusion 34 of each pawl 30 is not pressed against the inner circumferential surface of the intermediate cylindrical portion 13 of the ratchet 10, and thus does not hinder the meshing between the pawl 30 and the inner circumferential teeth 12A of the ratchet 10.

As shown in FIG. 13, (b) of FIG. 17 and (b) of FIG. 18, when the rotational position of the ratchet 10 with respect to the guide 20 is changed to the free region A2, if the pawls 30 are pressed radially outward by the rotary cam 40, the ride-up protrusion 34 of each pawl 30 is pressed against the inner circumferential surface of the intermediate cylindrical portion 13 of the ratchet 10 in a riding-on manner, and thus blocks the meshing between the pawl 30 and the inner circumferential teeth 12A of the ratchet 10. Hereinafter, the above configurations will be described in detail.

The ride-up protrusions 34 of the pawl 30 have different diameter dimensions from a central portion (position on the central axis C) of the guide 20 to the outer circumferential surface portion 34A, that is, different forming positions in the radial direction, between the main pawl P1 and the other two sub pawls P2. Specifically, the ride-up protrusion 34 of the main pawl P1 is formed in a position where the ride-up protrusion 34 of the main pawl P1 protrudes radially outward relative to the riding protrusions 34 of the other two sub pawls P2.

As shown in FIG. 10, (a) of FIG. 17, and (a) of FIG. 18, when overlapping in the rotation direction with the first region 13A (lock region A1) of the intermediate cylindrical portion 13 of the ratchet 10, the ride-up protrusion 34 of the main pawl P1 is not pushed out to a position where it rides on the first region 13A even if pushed radially outward by the rotary cam 40, and thus does not hinder the meshing between the main pawl P1 and the inner circumferential teeth 12A of the ratchet 10.

In this case, similarly, the ride-up protrusions 34 of the other two sub pawls P2 are not pushed out to positions where they ride on the second region 13B and the third region 13C when pushed radially outward by the rotary cam 40, and thus do not hinder the meshing between the sub pawls P2 and the inner circumferential teeth 12A of the ratchet 10. That is, the two sub pawls P2 are formed in positions radially inward of the ride-up protrusion 34 of the main pawl P1. For this reason, even when the two sub pawls P2 are respectively arranged in the second region 13B and the third region 13C (other regions A3), which protrude radially inward relative to the first region 13A, the two sub pawls P2 are not pressed to positions where the two sub pawls P2 respectively ride on the second region 13B and the third region 13C when the two sub pawls P2 are pressed radially outward by the rotary cam 40.

As shown in FIG. 13, (b) of FIG. 17, and (b) of FIG. 18, when overlapping in the rotation direction with the second region 13B (free region A2) of the intermediate cylindrical portion 13 of the ratchet 10, the ride-up protrusion 34 of the main pawl P1 rides on the second region 13B when pushed radially outward by the rotary cam 40, and thus blocks the meshing between the main pawl P1 and the inner circumferential teeth 12A of the ratchet 10.

However, at this time, even w % ben the riding protrusions 34 of the other two sub-pawls P2 overlap with the corresponding third region 13C (other region A3) and the first region 13A (other region A3) in the rotation direction, the riding protrusions 34 are not pressed to positions where the ride-up protrusions 34 ride on the third region 13C (other region A3) and the first region 13A (other region A3) when the ride-up protrusions 34 are pressed radially outward by the rotary cam 40, and thus do not block the radially outward movement of the sub pawls P2. In such a configuration as well, since the radially outward movement of the main pawl P1 is blocked at the intermediate position, the rotation of the rotary cam 40 is blocked, and thus the sub pawls P2 are not further pushed radially outward, thereby held together with the main pawl P1 in the unlocked state prevented from being pressed against the inner circumferential tooth 12A of the ratchet 10.

As shown in FIGS. 4, 5, and 19 to 20, each of the pawls 30 is formed by individually extruding the offset surface portion 30B and the ride-up protrusion 34 with respect to the body surface portion 30A in the identical axial direction in a manner spaced apart from each other in the radial direction. At this time, the offset surface portion 30B of each pawl 30 is formed such that accuracy control surfaces Q for enduring an accuracy to a surface shaped via half-punching are set on the inner circumferential surface portion (pressed surface portion 32) side of the body surface portion 30A that is formed via half-punching and has a surface facing the radially inner side, rather than on the outer circumferential surface portion side that is formed via half-punching and has a surface facing the radially outer side. According to the above configuration, each of the pawls 30 has a configuration in which the pressed surface portion 32 is formed with high accuracy.

The ride-up protrusion 34 of each pawl 30 is formed such that an accuracy control surface Q for enduring an accuracy to a surface shaped via half-punching is set on the outer circumferential surface portion 34A side. The outer circumferential surface portion 34A is formed via half-punching and has a surface facing the radially outer side. According to the above configuration, each of the pawls 30 has a configuration in which the outer circumferential surface portion 34A is formed with high accuracy. Thereby, each pawl 30 is formed by individually extruding the offset surface portion 30B and the ride-up protrusion 34 with respect to the body surface portion 30A in a manner spaced apart from each other in the radial direction, so that the accuracy of the shaping surfaces can be obtained by setting the accuracy control surfaces Q on front and back sides of each other.

The pressed surface portion 32 of each pawl 30, more specifically, regions deviated on both sides in the rotation direction from the formation location of the ride-up protrusion 34 thereof, are pressed from the radially inner side by the corresponding pressing portion 44 of the rotary cam 40 illustrated in FIG. 4. Therefore, in practice, the pressed surface portion 32 of each pawl 30 has the accuracy control surfaces Q set in regions on both sides that do not overlap with the ride-up protrusion 34 thereof in the rotation direction, and has no accuracy control surfaces Q set in a region that overlaps with the ride-up protrusion 34 in the rotation direction. According to the above configuration, even when the offset surface portion 30B and the ride-up protrusion 34 of each pawl 30 overlap with each other in the rotation direction, it is possible to appropriately set and form each of the accuracy control surfaces Q.

<<Rotary Cam 40>>

As shown in FIG. 5, the rotary cam 40 is formed by cutting one metal plate member into a substantially disc shape and half-punching portions of the metal plate member in the plate thickness direction (axial direction). The rotary cam 40 is set in a state accommodated in the cam accommodating groove 24B formed on the inner surface of the disc body 21 of the guide 20. As shown in FIG. 9, the rotary cam 40 has a plate thickness substantially equal to those of the pawls 30. The rotary cam 40 is sandwiched between the inner surface of the disc body 21 of the guide 20 and the offset surface portions 30B of the pawls 30 that are extruded in the axial direction in a half-punched manner, and surrounded by the body surface portions 30A of the pawls 30 from the outer circumferential side.

As shown in FIG. 5, the central portion (position on the central axis C) of the rotary cam 40 is formed with a through hole 41 through which the operation pin 5A, which is integrally coupled to the reclining lever 5 as illustrated in FIG. 1, is inserted from the axially inner side and is mounted integrally in the rotation direction. The operation pin 5A is inserted into the through hole 41 of the rotary cam 40 in a manner penetrating axially outward from the inner side, and is integrally connected with the reclining lever 5 as illustrated in FIG. 1 at a tip end thereof. According to the above configuration, the operation pin 5A can be rotated integrally with the rotary cam 40 in accordance with the pulling operation of the reclining lever 5.

The operation pin 5A is integrally coupled to the operation pin 5A inserted into the seat reclining device 4 on the other side as illustrated in FIG. 1 via a connecting rod 5B. According to the above configuration, upon the pulling operation of the reclining lever 5, the operation pin 5A on the other side is also rotated integrally, and the rotary cam 40 of the seat reclining device 4 on the same side is also rotated integrally.

Figure 6:
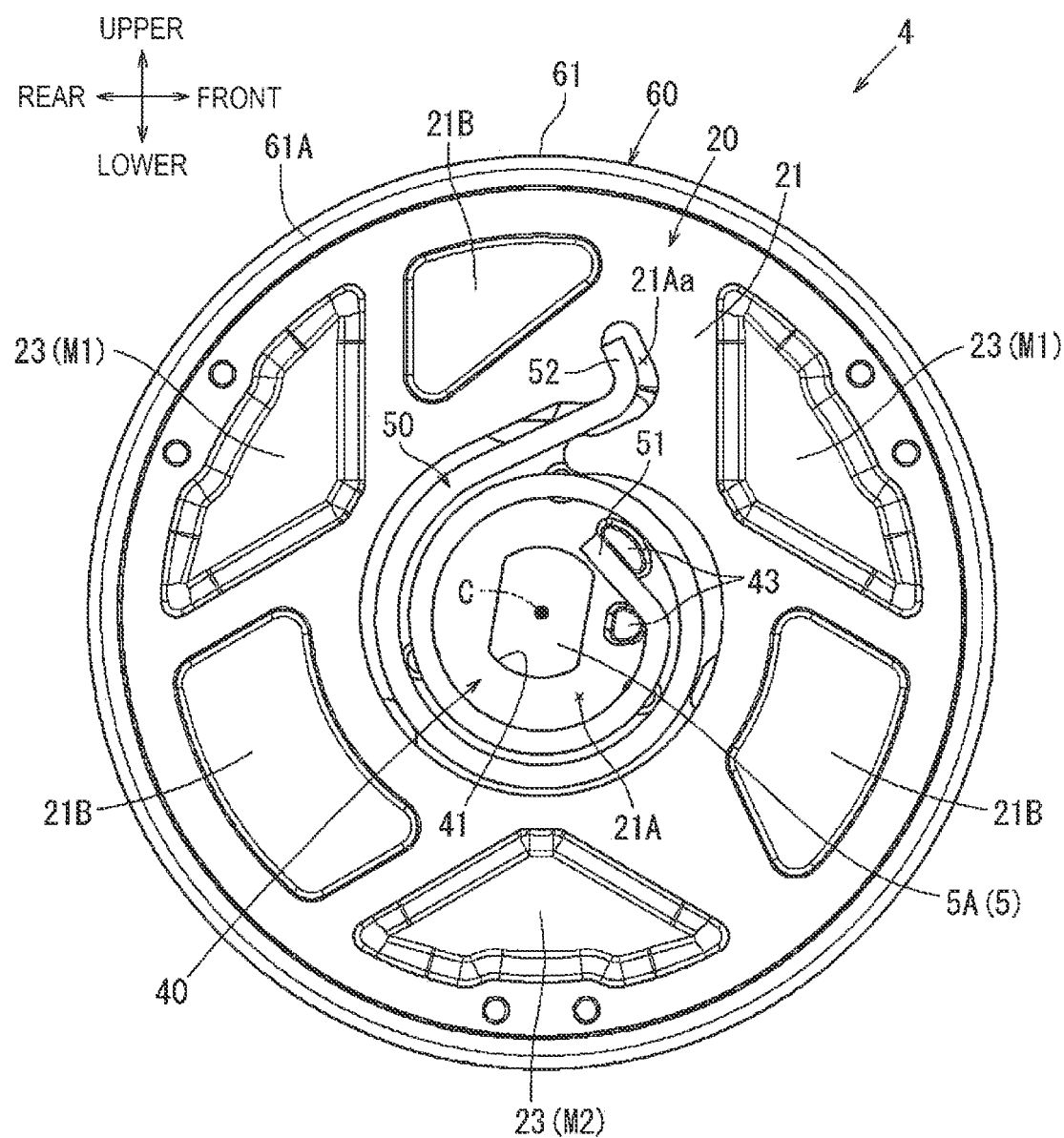
FIG. 6 is an outer side view of the vehicle seat reclining device.

As shown in FIG. 5, the rotary cam 40 is formed in a substantially disc shape larger than the through hole 21A formed in the central portion (position on the central axis C) of the guide 20. An outer surface of the rotary cam 40 that faces an inner side of the through hole 21A of the guide 20 is formed with two hook pins 43 protruding in the axial direction. As shown in FIGS. 2 and 6, an inner end portion 51 of the lock spring 50, which will be described later, is hooked and integrally fixed in a manner sandwiched between the hook pins 43. Further, on an inner surface of the rotary cam 40 that faces the offset surface portions 30B of the pawls 30, the three pull-in pins 42, which are set in a state of being respectively inserted into the corresponding pull-in holes 33 formed in the pawls 30, are formed to protrude in the axial direction.

The rotary cam 40 is assembled to the guide 20 in a state of being elastically supported via the lock spring 50. That is, from a state in which the rotary cam 40 is set in the cam accommodating groove 24B of the guide 20, the inner end portion 51 of the lock spring 50 is hooked between the hook pins 43 projecting from the outer surface of the rotary cam 40 that faces the inner side of the through hole 21A of the guide 20. Further, the lock spring 50 is set in the through hole 21A of the guide 20 in a manner such the outer end portion 52 of the lock spring 50 is hooked into the hooking hole 21Aa extending from the through hole 21A of the guide 20. As described above, the rotary cam 40 is elastically supported by the guide 20 via the lock spring 50.

As shown in FIG. 9, due to the assembly described above, the rotary cam 40 is supported in a state of being sandwiched in the axial direction between the disc body 21 of the guide 20 and the offset surface portions 30B of the pawls 30 extruded in a half-punched manner in the axial direction. Further, the rotary cam 40 is surrounded from the radially outer side by the pressed surface portions 32 which are the inner circumferential surface portions of the body surface portions 30A of the pawls 30.

The rotary cam 40 is constantly rotationally urged in the counterclockwise direction as shown in FIG. 10 with respect to the guide 20 by the spring urging force of the lock spring 50 hooked between the rotary cam 40 and the guide 20 (see FIGS. 2 and 6). Due to the counterclockwise rotation due to the urging force, the rotary cam 40 is operated to push the pressed surface portions 32 of the pawls 30 outward from the radially inner side by the respective pressing portions 44 formed so as to protrude at a plurality of positions in the rotation direction on the outer circumferential surface portion thereof.

When the reclining lever 5 as illustrated in FIG. 1 is pulled up, the rotary cam 40 is rotated in the illustrated clockwise direction, which is opposite to the urging direction, via the operation pin 5A as shown in FIG. 11. As a result, the rotary cam 40 is operated such that due to the shape of the pull-in hole 33 that changes toward the radially outer side, each of the pull-in pins 42 inserted into the pull-in hole 33 of each pawl 30 moves in the pull-in hole 33 in the rotation direction and simultaneously pulls the pawl toward the radially inner side.

Specifically, as shown in FIG. 10, in the state in which the pawls 30 are pushed out from the radially inner side by the rotational force due to the spring urging force of the lock spring 50 and meshed with the inner circumferential teeth 12A of the ratchet 10 (locked state), the rotary cam 40 is in a state where the inner end portion 51 of the lock spring 50 hooked between the hook pins 43 thereof is positioned in a region in the rotation direction between two guide walls M1 respectively on an upper left side and an upper right side in the drawing among the three guide walls 23 formed on the guide 20.

In the above state, due to the spring urging force received from the inner end portion 51 of the lock spring 50, the rotary cam 40 is affected by the action of an urging force that is decentered radially outward in addition to the illustrated rotational urging force in the counterclockwise direction. Nevertheless, when the pawls 30 are meshed with the inner circumferential teeth 12A of the ratchet 10, the rotary cam 40 is supported by the pawls 30 and thereby held in a state centered on the central portion (position on the central axis C) of the guide 20.

Figure 16:
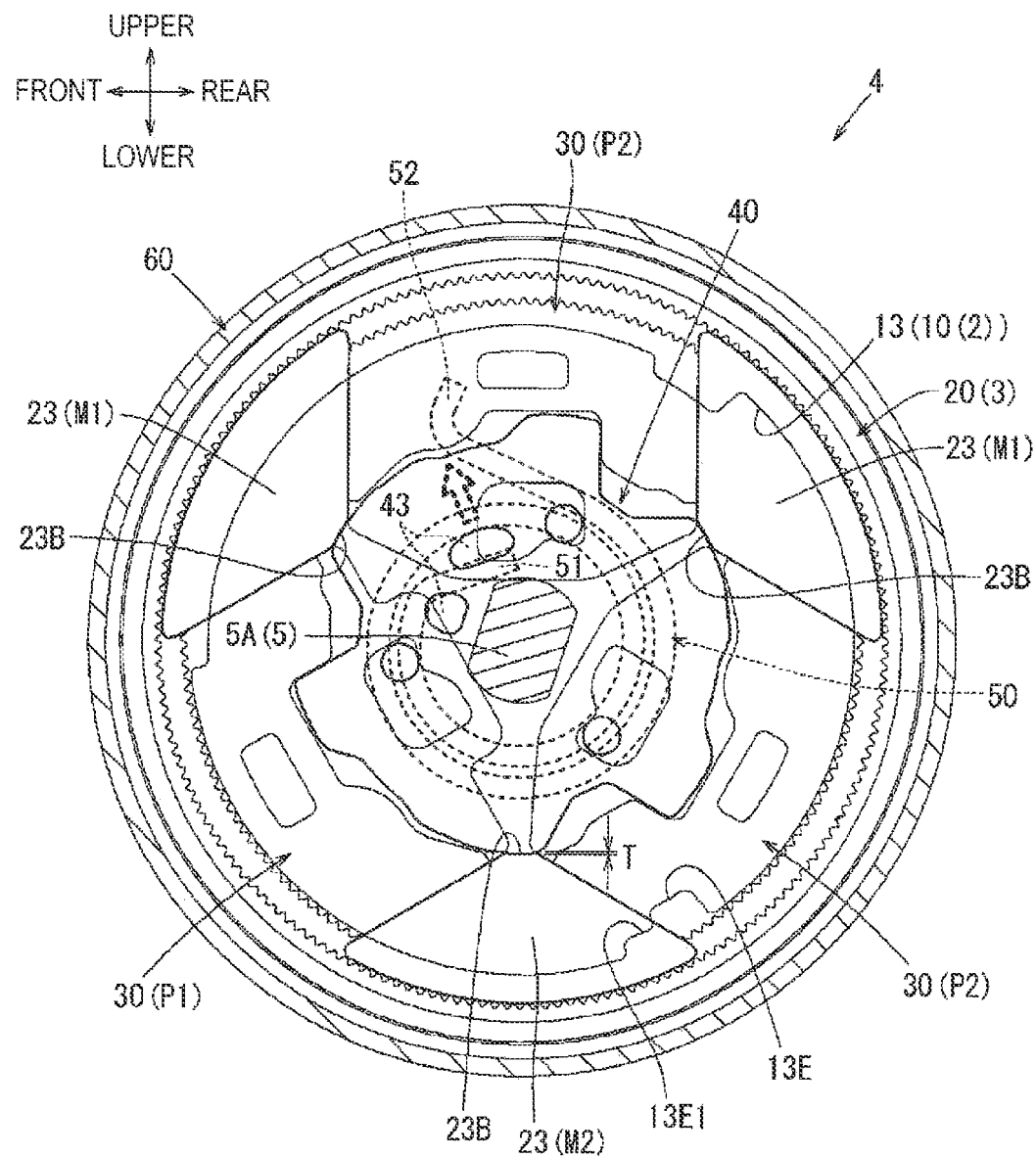
FIG. 16 is a cross-sectional view showing a state in which a rotary cam is urged and thereby pressed against a guide wall.

However, when the rotary cam 40 is rotated in the illustrated clockwise direction against the spring urging force of the lock spring 50 and thereby the pawls 30 are disengaged from the inner circumferential teeth 12A of the ratchet 10 as shown in FIG. 11, the rotary cam 40 is urged in a decentering direction by the inner end portion 51 of the lock spring 50, and thus is rotated in the illustrated clockwise direction in a manner sliding on the support surfaces 23B on the inner circumferential side of the above-described two guide walls M1 while being pressed against the support surfaces 23B of the above-described two guide walls M1 as shown in FIG. 16. At this time, different from the other two guide walls M1, the remaining one guide wall M2 has a slight radial gap T formed between the one guide wall M2 and the outer circumferential surface of the rotary cam 40.

According to such configuration, the rotary cam 40 is appropriately supported on the two guide walls M1 on which the rotary cam 40 is pressed against due to the spring urging force of the lock spring 50 so as not to move in an axial deviation direction (the decentering direction), while appropriately releasing movement of the rotary cam 40 when rattling occurs in a direction toward the remaining one guide wall M2 with these two guide walls serving as fulcrums, so that the rotary cam 40 can be smoothly sliding-rotated in a release direction without decentering.

<<Outer Circumferential Ring 60>>

As shown in FIGS. 4 and 5, the outer circumferential ring 60 is formed in a substantially cylindrical shape having a hollow disc-shaped base by punching one thin plate material into a ring shape and drawing an outer circumferential portion of the punched hollow disc into a shape that projects in a cylindrical shape in a thickness direction (axial direction). Thus, the outer circumferential ring 60 includes a flange portion 62 that has a hollow disc shape straightly facing the axial direction, and a coupling portion 61 that projects in the axial direction in a substantially cylindrical shape along an outer circumferential edge portion of the flange portion 62.

Specifically, the outer circumferential ring 60 is formed in a stepped cylindrical shape including two stages of inner and outer cylindrical shapes, in which the coupling portion 61 is extruded in a manner projecting in two stages in the axial direction from the outer circumferential portion of the flange portion 62, so as to form a stepped portion 63 that is shorter in the axial direction than the coupling portion 61 and that projects in a substantially cylindrical shape on an inner circumferential side of the coupling portion 61. After setting the three pawls 30, the rotary cam 40, and the lock spring 50 to the guide 20 and simultaneously assembling the ratchet 10, these assembled units are set inside the cylinder and the coupling portion 61 is crimped to the guide 20, and thereby the outer circumferential ring 60 is mounted spanning the outer circumferential portions of the ratchet 10 and the guide 20 (crimped portion 61A).

Figure 15:
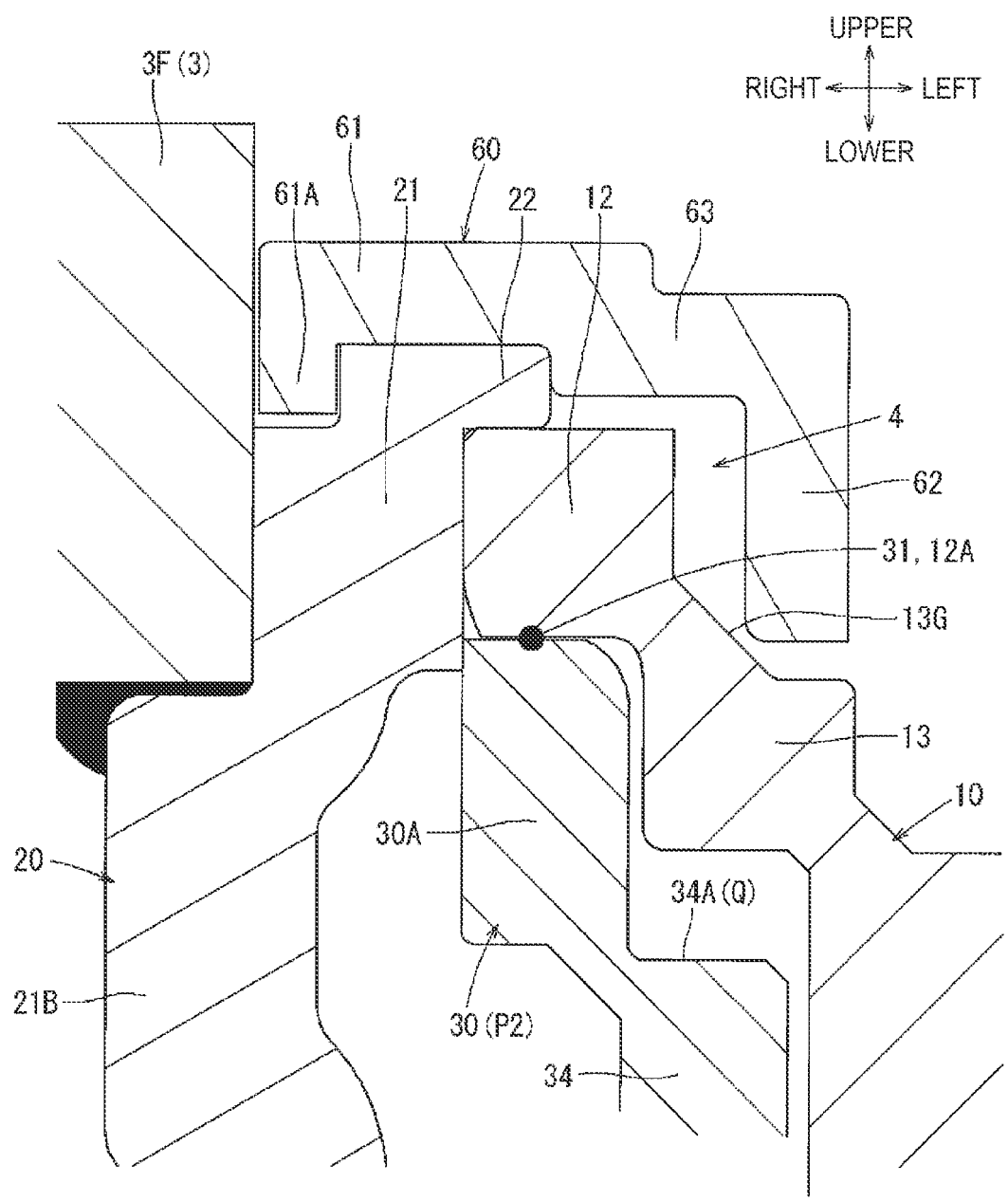
FIG. 15 is an enlarged view of part XV in FIG. 9.

More specifically, as shown in FIGS. 9 and 15, by sequentially assembling the above-described units into the cylindrical portion of the outer circumferential ring 60 from the ratchet 10, the stepped portion 63 abuts against the cylindrical portion 22 of the guide 20 in the axial direction, and the flange portion 62 covers the cylindrical portion 12 of the ratchet 10 from the outer side in the axial direction. Further, due to such setting, the cylindrical portion 22 of the guide 20 is fitted into the cylindrical coupling portion 61 of the outer circumferential ring 60.

After the above setting, the coupling portion 61 of the outer circumferential ring 60, specifically, the top end portion extending axially outward from the cylindrical portion 22 of the guide 20, bends radially inward, and is crimped on an outer surface of the cylindrical portion 22 of the guide 20 so that the cylindrical portion 22 is sandwiched in the axial direction between the top end portion and the stepped portion 63. Accordingly, the outer circumferential ring 60 is assembled in a manner extending between the outer circumferential portions of the ratchet 10 and the guide 20. Due to such assembly, the outer circumferential ring 60 is integrally coupled to the guide 20, and the ratchet 10 is held by the flange portion 62 thereof without rattling with respect to the guide 20 either in the axial direction or in the radial direction.

More specifically, the outer circumferential ring 60 is set such that a corner portion at the top protruding radially inward of the flange portion 62 leans against an inclined surface 13G that is formed on the axially outer surface side between the intermediate cylindrical portion 13 and the cylindrical portion 12 of the ratchet 10 and that obliquely faces the radially outer side. Therefore, due to the corner portion at the corner protruding radially inward of the flange portion 62, the outer circumferential ring 60 is held in a state in which the ratchet 10 is prevented from rattling axially outward and radially outward.

Here, as shown in FIGS. 5 and 7, the outer circumferential ring 60 is formed with oblique abutting portions crimped in a manner protruding axially inward in three regions in the rotation direction of the flange portion 62. When the oblique abutting portions 62A overlap in the rotation direction with protruding inclined surfaces 13H that are formed on three regions in the rotation direction on the inclined surface 13G of the ratchet 10 and that each have a surface oriented axially outward and radially outward, each oblique abutting portion 62A abuts against the corresponding protruding inclined surface 13H in a riding manner. Therefore, the oblique abutting portions 62A are held in a state in which the ratchet 10 is more appropriately prevented from rattling axially outward and radially outward.

The oblique abutting portions 62A formed on the flange portion 62 of the outer circumferential ring 60 are formed by crimping three regions in the rotation direction of the flange portion 62 in a manner bent obliquely such that an end portion on a radially inner side of each region protrudes axially inward with an end portion on an outer side as a base point. The end portion on the outer side is a joint with the stepped portion 63. In accordance with a shape of a mold against which the ratchet 10 abuts upon half-punching, the protruding inclined surfaces 13H formed on the three regions in the rotation direction of the inclined surface 13G of the ratchet 10 are formed in a manner substantially parallel to the inclined surface 13G and obliquely protruding so as to be axially outer and radially outer than the inclined surface 13G.

The protruding inclined surfaces 13H are arranged at equal intervals in the three regions in the rotation direction of the inclined surface 13G. The protruding inclined surfaces 13H each have a length in the rotation direction of about 20 degrees. Both side portions in the rotation direction of each protruding inclined surface 13H are respectively formed with guide inclined surfaces 13H1 that are thickened for obliquely smoothing a step between the protruding inclined surface 13H and the inclined surface 13G. The oblique abutting portions 62A formed on the flange portion 62 of the outer circumferential ring 60 are also arranged at equal intervals in the three regions in the rotation direction of the flange portion 62. The oblique abutting portions 62A each have a length in the rotation direction of about 20 degrees.

When the backrest angle of the seat back 2 is in an angular region between the torso angle Pd (about 20 degrees) and the initial lock position Pb in a straight posture that is erected upright as shown in FIG. 21, the protruding inclined surfaces 13H formed on the inclined surface 13G of the ratchet 10 overlap in the rotation direction with the corresponding oblique abutting portions 62A formed on the flange portion 62 of the outer circumferential ring 60, and the oblique abutting portions 62A ride on and abut against the corresponding protruding inclined surfaces 13H (abutting region B1) as shown in FIGS. 22 and 23.

Therefore, the outer circumferential ring 60 is held in a state in which the ratchet 10 is more appropriately prevented from rattling in the axial direction and the radial direction by the oblique abutting portions 62A. At this time, as shown in FIG. 24, the flange portion 62 of the outer circumferential ring 60 comes into a non-abutting state that is spaced from, without abutting against, the inclined surface 13G of the ratchet 10. As shown in FIG. 21, the abutting region B1 is set in an angular region of about 40 degrees in which the backrest angle of the seat back 2 is between an angular position inclined forward by about 10 degrees from the straight position, i.e., the initial lock position Pb, and an angular position inclined rearward by about 10 degrees from the torso angle Pd.

In the abutting region B1, as shown in FIG. 22, prevention of rattling of the ratchet 10 by the outer circumferential ring 60 is stronger, and thus a sliding friction resistance due to abutment therebetween can easily prevent rotational movement of the ratchet 10 with respect to the guide 20. However, when the seat back 2 is in an erected angular region as described above, since the urging forces of the return springs 6 (see FIG. 1) that urge the seat back 2 in the forward rotation direction are relatively strong, the seat back 2 can be smoothly rotated even when the rattling elimination is performed as described above.

When, as shown in FIG. 25, the backrest angle of the seat back 2 transfers into an angular region deviated rearward from the abutting region B1 as shown in FIG. 21, the outer circumferential ring 60 comes into a non-abutting state in which the inclined surface 13G of the ratchet 10 overlaps in the rotation direction with the oblique abutting portions 62A formed on the flange portion 62, and a slight gap is formed between the oblique abutting portions 62A and the inclined surface 13G of the ratchet 10 (non-abutting region B2) as shown in FIGS. 26 and 27. At this time, as shown in FIG. 28, a partial region of the flange portion 62 of the outer circumferential ring 60 comes into a state that overlaps in the rotation direction with the protruding inclined surfaces 13H of the ratchet 10, but is in a non-abutting state spaced from, without abutting against, the protruding inclined surfaces 13H.

In the region described above (the non-abutting region B2), prevention of rattling of the ratchet 10 due to the outer circumferential ring 60 is difficult, but conversely, the ratchet 10 can be smoothly rotated with respect to the guide 20. Therefore, when the seat back 2 is in the rearward-tilted angular region as described above, although the urging forces of the return springs 6 (see FIG. 1) that urge the seat back 2 in the forward rotation direction are relatively weak, the seat back 2 can be smoothly erected forward.

When, as shown in FIG. 29, the backrest angle of the seat back 2 transfers into an angular region deviated forward from the abutting region B1 as shown in FIG. 21, the outer circumferential ring 60 also comes into a non-abutting state in which the inclined surface 13G of the ratchet 10 overlaps in the rotation direction with the oblique abutting portions 62A formed on the flange portion 62, and a slight gap is formed between the oblique abutting portions 62A and the inclined surface 13G of the ratchet 10 (non-abutting region B2) as shown in FIGS. 30 and 31. At this time, as shown in FIG. 32, a partial region of the flange portion 62 of the outer circumferential ring 60 comes into a state that overlaps in the rotation direction with the protruding inclined surfaces 13H of the ratchet 10, but is in a non-abutting state spaced from, without abutting against, the protruding inclined surfaces 13H.

In the region described above (the non-abutting region B2), prevention of rattling of the ratchet 10 by the outer circumferential ring 60 is also difficult, but conversely, the ratchet 10 can be smoothly rotated with respect to the guide 20. Therefore, when the seat back 2 is in the forward-tilted angular region as described above, a force for erecting the seat back 2 rearward is larger, but the seat back 2 can be smoothly erected rearward in such a region as well.

<<Summary>>

In summary, the seat reclining device 4 according to the present embodiment has the following configuration. That is, the vehicle seat reclining device (4) includes: the ratchet (10) and the guide (20) assembled in the axial direction so as to be rotatable relative to each other; and the plurality of pawls (30) arranged in the rotation direction. The plurality of pawls is configured to mesh with the ratchet (10) to lock the relative rotation between the ratchet (10) and the guide (20) by moving outward in a radial direction while being supported in the rotation direction by the guide (20).

The ratchet (10) includes the lock region (A1) and the free region (A2) in the rotation region with respect to the guide (20). The lock region (A1) is configured to allow meshing of a particular pawl (P1) among the plurality of pawls (30) from the inner side in the radial direction, the free region (A2) is configured to allow the ride-up protrusion (34) of the particular pawl (P1) to ride on the ride-up surface of the ratchet so as to hinder the meshing of the particular pawl (P1) from the inner side in the radial direction, and the lock region (A1) and the free region (A2) are continuous to each other. The ratchet (10) also includes the convex portion (13E) protruding so as to abut in the rotation direction against the ride-up protrusion (34) of the particular pawl (P1). The convex portion (13E) is provided at an end portion of the lock region (A1) on an opposite side of a side of the lock region (A1) that is next to the free region (A2).

The convex portion (13E) has, only in a partial region thereof in the rotation direction, the relief concave portion (13E1) configured to avoid abutment in the rotation direction between the ride-up protrusion (34) and the convex portion (13E) upon rotation of the ratchet (10). According to the configuration described above, in a case where tilting of the seat back (2) is to be locked to the end position of the lock region (A1) by the locking structure (2Fc, 3Fd) set outside of the vehicle seat reclining device (4), it is possible to prevent abutment in the rotation direction between the ride-up protrusion (34) and the convex portion (13E) by the relief concave portion (13E1). Thereby, it is possible to prevent the load for locking the tilting of the seat back (2) to the predetermined position (Pc) from being applied to the vehicle seat reclining device (4).

The convex portion (13E) serves as an abutting portion on which the other pawl (P2) among the plurality of pawls abuts in the rotation direction when the ride-up protrusion (34) of the particular pawl (P1) abuts against the step of the ride-up surface from the lock region (A1). According to the configuration described above, it is possible to appropriately release abutment in the rotation direction between the ride-up protrusion (34) and the convex portion (13E) without deteriorating the function of the convex portion (13E) as the abutting portion.

When the ride-up protrusion (34) overlaps with the convex portion (13E) in the radial direction in a manner that the ride-up protrusion (34) does not abut against the convex portion (13E) in the rotation direction, meshing of the particular pawl (P1) to the ratchet (10) is hindered by riding of the ride-up protrusion (34) on the convex portion (13E). According to the configuration described above, it is possible to appropriately prevent the particular pawl (P1) from meshing with the ratchet (10) beyond the lock region (A1).

The vehicle seat reclining device (4) is configured to function as a joint device that couples the seat back (2) to the base (3) on the vehicle body in such a way that the inclination angle of the seat back (2) is adjustable. The locking structure (2Fc, 3Fd) configured to lock tilting of the seat back (2) at the predetermined position (Pc) is provided between the seat back (2) and the base (3). In this case, the relief concave portion (13E1) releases abutment in the rotation direction between the ride-up protrusion (34) and the convex portion (13E) upon rotation of the ratchet (10) toward the predetermined position (Pc) when the locking structure (2Fc. 3Fd) locks the tilting of the seat back (2) to the predetermined position. According to the configuration described above, when the locking structure (2Fc, 3Fd) set outside of the vehicle seat reclining device (4) locks tilting of the seat back (2) to the predetermined position (Pc), it is possible to appropriately prevent abutment in the rotation direction between the ride-up protrusion (34) and the convex portion (13E).

In the predetermined position (Pc), the gap (Y) in the rotation direction is provided between the ride-up protrusion (34) and the convex portion (13E). According to the configuration described above, when the locking structure (2Fc, 3Fd) set outside of the vehicle seat reclining device (4) locks tilting of the seat back (2) to the predetermined position (Pc), it is possible to more appropriately prevent abutment in the rotation direction between the ride-up protrusion (34) and the convex portion (13E).

Second Embodiment

Next, a configuration of a seat reclining device (vehicle seat reclining device) 4 of a second embodiment will be described with reference to FIG. 34. In the present embodiment, the ride-up protrusion 34 of the main pawl P1 (corresponding to the "particular pawl" in the present invention) is formed with a relief concave portion 34B that releases the abutment against the second convex portion 13E (corresponding to the "convex portion" in the present invention) in the rotation direction.

The relief concave portion 34B is formed in a shape in which a corner portion of the ride-up protrusion 34 on a counterclockwise side in the drawing is thinned in a substantially rectangular shape. Even when the ride-up protrusion 34 of the main pawl P1 overlaps with the second convex portion 13E in the rotation direction, the relief concave portion 34B receives the second convex portion 13E so that the second convex portion 13E does not abut against the ride-up protrusion 34 in the rotation direction. Specifically, the relief concave portion 34B receives the second convex portion 13E in a state in which a gap Y in the rotation direction is defined between the relief concave portion 34B and a side surface of the second convex portion 13E on a clockwise side in the drawing. As a result, the locking operation of the seat reclining device 4 is prevented in a rotation position in which the second convex portion 13E enters the relief concave portion 34B (rotation position beyond the lock region A1). Configurations other than the above are the same as the seat reclining device 4 shown in Embodiment 1 and are accordingly denoted by the same reference numerals and detailed descriptions thereof are omitted.

Other Embodiments

Although the embodiments of the present disclosure have been described using two embodiments, the present disclosure can be implemented in various forms other than the above embodiment.

1. The vehicle seat reclining device of the present invention can be applied to a seat other than a right seat of an automobile, and can also be widely applied to a seat provided for a car other than an automobile, for example, railway, or various vehicles such as an aircraft and a ship. In addition to the vehicle seat reclining device which connects the seat back to the seat cushion (base) in a state in which the backrest angle can be adjusted, the vehicle seat reclining device may connect the seat back to a base fixed to the vehicle body side such as a bracket in a state in which the backrest angle can be adjusted.

2. The vehicle seat reclining device may be configured in such a way that the ratchet is coupled to a base fixed to a vehicle body, such as a seat cushion, and the guide is coupled to a seat back.

3. Two or four or more pawls for locking the relative rotation between the ratchet and the guide may be provided side by side in the rotation direction. Arrangements of the pawls in the rotation direction are not limited to even arrangements, and the pawls may be arranged in a biased manner.

4. In addition to the type that pushes the pawls radially outward via rotation, the cam operated to push the pawls radially outward may be of a type that slides to push the pawls radially outward via radial slide in a radial direction intersecting the sliding direction (see JP-A-2015-227071). The operation of pulling the pawls radially inward may be performed by a member other than the cam such as a release plate (see the same document).

5. The abutting portion of the outer circumferential ring obliquely abuts against the ratchet, but may also abut straightly from the axially outer side. The outer circumferential ring may be configured such that the coupling portion is coupled to the ratchet and the abutting portion abuts against the guide from the axially outer side. The coupling portion of the outer circumferential ring is coupled by crimping to one of the ratchet and the guide, but may also be coupled by welding. The cylindrical portion may be set to the ratchet, rather than the guide, so as to cover the guide in a manner surrounding from the outer circumferential side.

6. The relief concave portion may be formed to both the ride-up protrusion (the ride-up protrusion 34 in the embodiments described above) and the convex portion (the second convex portion 13E in the embodiments described above). The convex portion is configured by an abutting portion on which the other pawl among the plurality of pawls abuts in the rotation direction when the ride-up protrusion abuts against the step of the ride-up surface of the free region from the lock region, but may also be configured by another member protruding for another purpose.

The relief concave portion may have a concave shape in which the convex portion or the ride-up protrusion can be received and thus the particular pawl can be locked to the inner circumferential teeth of the ratchet in a rotational position state in which the ride-up protrusion and the convex portion overlap with each other in the rotation direction (rotational position state beyond the lock region). The relief concave portion may have a concave shape cut in an inclined surface shape or a curved surface shape.

The present application is based on a Japanese Patent Application No. 2019-049802, filed on Mar. 18, 2019, the contents of which are incorporated herein by reference.

INDUSTRIAL APPLICABILITY

The vehicle seat reclining device is capable of preventing a load for locking tilting of a seat back to a predetermined position to be applied thereto. The present invention having this effect is useful, for example, for a seat of an automobile or the like.

REFERENCE SIGNS LIST

1 seat
2 seat back
2F side frame
2Fa fitting hole
2Fb penetrating hole
2Fc locking plate (locking structure)
3 seat cushion (base)
3F reclining plate
3Fa fitting hole
3Fb penetrating hole
3Fc front stopper
3Fd rear stopper (locking structure)
4 seat reclining device (vehicle seat reclining device)
5 reclining lever
5A operation pin
5B connecting rod
6 return spring
10 ratchet
11 disc body
11A through hole
11B expanded surface portion
12 cylindrical portion
12A inner circumferential teeth
13 intermediate cylindrical portion
13A first region
13B second region
13C third region
13D first convex portion
13E second convex portion (convex portion)
13E1 relief concave portion
Y gap
13G inclined surface
13H protruding inclined surface
13H1 guide inclined surface
A1 lock region
A2 free region
A3 other region
A4 coupling region
14 dowel
W welding location
B1 abutting region
B2 non-abutting region
20 guide
21 disc body
21A through hole
21Aa hooking hole
21B dowel
22 cylindrical portion
23 guide wall
23A regulating surface 23B support surface
M1 guide wall
M2 guide wall
T gap
24A pawl accommodating groove
24B cam accommodating groove
30 pawl
30A body surface portion
30B offset surface portion
31 outer circumferential teeth
32 pressed surface portion
33 pull-in hole
34 ride-up protrusion
34A outer circumferential surface portion
34B relief concave portion
P1 main pawl (particular pawl)
P2 sub pawl (other pawl)
Q accuracy control surface
40 rotary cam
41 through hole
42 pull-in pin
43 hook pin
44 pressing portion
50 lock spring
51 inner end portion
52 outer end portion
60 outer circumferential ring
61 coupling portion
61A crimped portion
62 flange portion
62A oblique abutting portion
63 stepped portion
C central axis
Pa forward-tilting position
Pb initial lock position
Pc rearward-tilted position (predetermined position)
Pd torso angle

The invention claimed is:

1. A vehicle seat reclining device comprising:
a ratchet and a guide assembled in an axial direction so as to be rotatable relative to each other; and
a plurality of pawls arranged in a rotation direction, the plurality of pawls being configured to mesh with the ratchet to lock the relative rotation between the ratchet and the guide by moving outward in a radial direction while being supported in the rotation direction by the guide,
wherein the ratchet includes a lock region and a free region in a rotation region with respect to the guide, the lock region being configured to allow meshing of a particular pawl among the plurality of pawls from an inner side in the radial direction, the free region being configured to allow a ride-up protrusion of the particular pawl to ride on a ride-up surface of the ratchet so as to hinder the meshing of the particular pawl from the inner side in the radial direction, and the lock region and the free region being continuous to each other,
wherein the ratchet also includes a convex portion protruding so as to abut in the rotation direction against the ride-up protrusion of the particular pawl, the convex portion being provided at an end portion of the lock region on an opposite side of a side of the lock region that is next to the free region, and
wherein at least one of the ride-up protrusion and the convex portion has, only in a partial region thereof in the rotation direction, a relief concave portion configured to avoid abutment in the rotation direction between the ride-up protrusion and the convex portion upon rotation of the ratchet.

2. The vehicle seat reclining device according to claim 1, wherein the convex portion serves as an abutting portion on which another pawl among the plurality of pawls abuts in the rotation direction when the ride-up protrusion of the particular pawl abuts against a step of the ride-up surface from the lock region.

3. The vehicle seat reclining device according to claim 1, wherein when the ride-up protrusion overlaps with the convex portion in the radial direction in a manner that the ride-up protrusion does not abut against the convex portion in the rotation direction, meshing of the particular pawl to the ratchet is hindered by riding of the ride-up protrusion on the convex portion.

4. The vehicle seat reclining device according to claim 1, wherein the relief concave portion is formed in the convex portion.

5. The vehicle seat reclining device according to claim 1, wherein in a case where the vehicle seat reclining device is configured to function as a joint device that couples a seat back to a base on a vehicle body in such a way that an inclination angle of the seat back is adjustable, and a locking structure configured to lock tilting of the seat back at a predetermined position is provided between the seat back and the base,
the relief concave portion is configured to avoid abutment in the rotation direction between the ride-up protrusion and the convex portion upon rotation of the ratchet toward the predetermined position when the locking structure locks the tilting of the seat back to the predetermined position.

6. The vehicle seat reclining device according to claim 5, wherein, in the predetermined position, a gap in the rotation direction is provided between the ride-up protrusion and the convex portion.

* * * * *